US012568417B2

(12) United States Patent
Seed et al.

(10) Patent No.: US 12,568,417 B2
(45) Date of Patent: Mar. 3, 2026

(54) SUPPORT OF END-TO-END EDGE APPLICATION SERVICE CONTINUITY

(71) Applicant: CONVIDA WIRELESS, LLC, Wilmington, DE (US)

(72) Inventors: Dale Seed, Allentown, PA (US); Lu Liu, Conshohocken, PA (US); Xu Li, Plainsboro, NJ (US); Catalina Mladin, Hatboro, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/689,459

(22) PCT Filed: Sep. 7, 2022

(86) PCT No.: PCT/US2022/076027

§ 371 (c)(1),
(2) Date: Mar. 6, 2024

(87) PCT Pub. No.: WO2023/039409

PCT Pub. Date: Mar. 16, 2023

(65) Prior Publication Data

US 2025/0023953 A1     Jan. 16, 2025

Related U.S. Application Data

(60) Provisional application No. 63/241,273, filed on Sep. 7, 2021.

(51) Int. Cl.
*H04W 36/00* (2009.01)
*H04L 67/148* (2022.01)

(52) U.S. Cl.
CPC ........... *H04W 36/13* (2023.05); *H04L 67/148* (2013.01)

(58) Field of Classification Search
CPC ........................... H04W 36/13; H04L 67/148
See application file for complete search history.

(56) References Cited

U.S. PATENT DOCUMENTS 11,477,846 B2 * 10/2022 Fang ................... H04L 67/1095
2013/0155889 A1    6/2013 Brownworth et al.
(Continued)

OTHER PUBLICATIONS

ETSI, "Developming Software for Multi Access Edge Computing", Feb. 2019.*
(Continued)

*Primary Examiner* — Todd L Barker
(74) *Attorney, Agent, or Firm* — Flaster Greenberg, P.C.

(57) ABSTRACT

Support of end-to-end edge application service continuity is described herein. In one aspect, a service resident on a first wireless transmit/receive unit (WTRU) can receive, from a first application resident on the first WTRU, information for an association between the first application and a second application resident on a second WTRU. The service can send the association information to a service in the network such that the first and second applications are assigned to a first application server providing the type of service required for first and second application interactions. The service can detect the first WTRU's location is no longer in the service area of the first application server, and can send a request to the service in the network such that the first application and second applications are assigned to a second application server providing the type of service required for interactions between the first and second applications.

20 Claims, 24 Drawing Sheets

(56) References Cited

U.S. PATENT DOCUMENTS

| 2021/0144202 A1* | 5/2021 | Maciocco | ........... H04L 67/1051 |
| 2021/0212168 A1* | 7/2021 | Yoden | ................... H04W 88/06 |
| 2021/0243826 A1* | 8/2021 | Hoffmann | ............. H04W 76/14 |
| 2021/0258374 A1 | 8/2021 | Wang et al. | |

OTHER PUBLICATIONS

Venito et al., "Edge Computing wit peer to peer interactionsL use cases and impact", Apr. 2019.*

* cited by examiner

SUPPORT OF END-TO-END EDGE APPLICATION SERVICE CONTINUITY

CROSS-REFERENCE TO RELATED APPLICATIONS

This application is the National Stage Application of International Patent Application No. PCT/US2022/076027, filed Sep. 7, 2022, which claims the benefit of U.S. Provisional Application No. 63/241,273 filed on Sep. 7, 2021, entitled "Support of End-to-End Edge Application Service Continuity", the content of which is hereby incorporated by reference in its entirety.

BACKGROUND

This application pertains to wireless networks such as those described by standards such as the 3GPP TS 23.558 SA6 defines architecture for enabling edge applications.

SUMMARY

To address end-to-end edge application service continuity (E2E-EASC) shortcomings of, for example, the SA6 defined edge enabler layer, the present disclosure proposes functionality that provides edge application service continuity support between two or more ACs that are resident on different UEs and that interact with one another via a common EAS.

This proposed functionality ensures that the ACs continue to interact with one another through a common serving EAS even if a transition to a new EAS is required by one or more of the ACs. If/when a trigger condition (e.g., a UE moves or a serving EAS becomes overloaded or unavailable) is detected that requires a transition of one or more ACs from an existing serving EAS to a new serving EAS, the proposed functionality ensures that all the ACs that are interacting with one another, via the existing serving EAS, are transitioned together in unison to a new serving EAS. This ensures that that interaction between the two or more ACs can continue with minimal or no interruption and thus enabling end-to-end edge application service continuity as shown in FIG. 4. In FIG. 4, two UEs host ACs that interact with one another. At Time X, the ACs on the two UEs interact through EAS 1. At Time Y, a trigger event occurs (e.g., one or both UEs move outside the service area of EAS 1) such that a transition of the UEs to a new serving EAS 2 is required to maintain edge application service continuity. As a result, the two UEs and their ACs are both transitioned to EAS 2 in unison such that edge application service continuity is preserved between the ACs.

A summary of the proposed functionality is captured below in reference to two main ideas.

The first main idea is functionality resident on a UE that has one or more of the following features and/or performs one or more of the following operations to enable end-to-end edge application service continuity between one or more ACs resident on the UE and one or more ACs resident on other UE(s) that interact with one another via a common serving EAS. In some cases, the functionality resident on the UE may be a 3GPP SA6 defined EEC or another function on the UE. In some cases, a method can include receiving a request from one or more ACs resident on the UE. In some cases, the request may comprise information concerning one or more ACs resident on other UEs in the network that the resident ACs interact with through an application or service provided by an EAS. In some cases, the information may include one or more of the following information elements:

identifiers of specified types or instances of ACs, identifiers for each UE hosting the ACs, location information of the hosting UEs, interaction requirements of the ACs (e.g., schedule, QoS, etc.), identifiers of one or more types or instances of EASs needed for the ACs to interact with one another. In some cases, the request may comprise an operation to establish, update, terminate, retrieve, or discover an association between AC(s) resident on the UE and AC(s) resident on other UE(s). In some cases, the request may be a subscription request asking for notifications regarding AC association (e.g., if/when a transition to a different serving EAS is required to maintain existing associations between AC(s) resident on the UE and other AC(s) resident on other UE(s)).

The method can also include determining an AC association between two or more ACs is to be established, updated, or terminated. In some cases, the determination is based on receiving one or more AC association requests from ACs resident on the same UE, receiving one or more AC association requests from other entities in the network such as but not limited to an ECS, EES or a function in an underlying 3GPP network, or by analyzing context information collected for one or more ACs or other entities in the network.

The method can also include establishing, retrieving, updating, or terminating an end-to-end association between the two or more specified ACs. In some cases, establishing the association may include one or more of the following operations: determining conditions for establishing a new association between ACs have been met (e.g., ACs receiving services from the same EAS); triggering the instantiation of one or more EASs that provide the type of application or service required by the specified ACs; selecting one or more EASs that provide the type of application or service required by the specified ACs and that have a service coverage area that spans the locations of the UEs hosting the specified ACs or that have availability to meet the interaction requirements of the specified ACs; storing the end-to-end AC association information elements such that they may be later factored into edge application service continuity operations; and sending a notification of the association to the one or more selected EASs and/or applicable ACs.

In some cases, updating an existing association may include one or more of the following operations: updating end-to-end AC association information stored for the association with information elements included in the request or determined while processing the request (e.g., selection of a new EAS) such that it may be later factored into edge application service continuity operations; and performing E2E-EASC operations if required.

In some cases, terminating the association may include one or more of the following operations: determining conditions for terminating an association between ACs have been met; removing any stored end-to-end AC association information for the association, sending a notification of the terminated association to the one or more EASs associated with the association, where the notification may include information of the association.

In some cases, the method can include sending a request to a function in the network to establish, update, retrieve, terminate, discover, or subscribe to an end-to-end association between one or more ACs resident on the UE and one or more ACs resident on other UE(s) that interact with one another through an application or service provided by an EAS. In some cases, the function in the network targeted by the request may be an EES, ECS or another type of network function. In some cases, the request may include one or more of the following types of information: identifiers of specified types or instances of ACs applicable to the end-to-end association, identifiers for each UE hosting the ACs, identifiers for EECs on the hosting UEs, location information of the hosting UEs, interaction requirements of the ACs (e.g., schedule, QoS, etc.), or identifiers of one or more types or instances of EASs needed for the ACs to interact with one another. In some cases, the request may be a separate standalone request or may be embedded (e.g., piggybacked) as information elements included within an existing request such as but not limited to a service provisioning, EEC registration, EAS discovery or ACR request.

In some cases, the method can include receiving a response from the function in the network that may include one or more of the following types of information: a status indication of whether the request was received and processed successfully; an identifier of an association between ACs; identifiers of one or more selected EASs that the specified ACs are to use to interact with one another; and updates to information specified in the request (e.g., modifications/overrides made to the schedule or QoS settings).

In some cases, the method can include sending a subscription request to receive notifications from a network function. In some cases, the subscription may request notifications be sent if/when an association between AC(s) resident on the UE and AC(s) resident on other UE(s) has been established, updated, or terminated. In some cases, the subscription may request notifications be sent if/when a transition to a different serving EAS is required to maintain existing associations between AC(s) resident on the UE and AC(s) resident on other UE(s). In some cases, the function in the network targeted by the subscription request may be an EES, ECS or another type of function in the network. In some cases, the subscription request may include one or more of the following types of information: identifier(s) of AC association(s), identifiers of specified types or instances of ACs applicable to the end-to-end association, identifiers for each UE hosting the ACs, location information of the hosting UEs, interaction requirements of the ACs (e.g., schedule, QoS, etc.), and identifiers of one or more types or instances of EASs needed for the ACs to interact with one another. In some cases, the request may be a separate and standalone request or may be embedded (e.g., piggybacked) as information elements included within an existing request such as but not limited to an AC association, service provisioning, EEC registration, EAS discovery request or ACR request.

In some cases, the method can include receiving a notification from a function in the network. In some cases, the notification may indicate that an association between AC(s) resident on the UE and AC(s) resident on other UE(s) has been established, updated, or terminated. In some cases, the notification may indicate a transition to a different serving EAS is required to maintain existing associations between AC(s) resident on the UE and AC(s) resident on other UE(s). In some cases, the function in the network that originated the notification is an EES, ECS, or another type of function in the network. In some cases, the notification may include one or more of the following types of information: identifiers of specified types or instances of ACs applicable to the end-to-end association, identifiers for each UE hosting the ACs, location information of the hosting UEs, identifier of a new targeted EES and/or EAS that the local EEC and AC(s) must transition to using for continued interaction with the AC(s) on the other UE(s)

In some cases, the method can include processing the notification by performing one or more of the following operations: checking whether any ACs resident on the UE still have an active association with any of the ACs on the other UEs specified in the notification; issuing request(s) to register to the targeted EES specified in the notification; issuing request(s) to the targeted EES specified in the notification to determine a targeted EAS (if not already specified in the notification) that can be used by AC(s) resident on the UE to interact with AC(s) on other UE(s) and receiving back a response with an identifier of an EAS. In some cases, the request may include one or more of the following types of information: identifiers of specified types or instances of ACs, identifiers for each UE hosting the ACs, location information of the hosting UEs, interaction requirements of the ACs (e.g., schedule, QoS, etc.), identifiers of the type or instance of EAS needed for the ACs to interact with one another, In some cases, the method can include determining a targeted EAS from either the notification or discovery response that provide the type of application or service required by the ACs to interact with one another.

In some cases, the method can include issuing request to the targeted EES specified in the notification or the serving EES to perform ACR to migrate context information from the serving EES and/or EAS to the selected targeted EES and/or EAS.

In some cases, the method can include informing the AC(s) resident on the UE that the ACR has completed and that they should discontinue using the serving EAS and transition over to using the targeted EAS In some cases, the method can include sending a response to the function in the network that originated the notification that may include one or more of the following types of information: the results of any ACR operation(s) performed, an updated list of ACs resident on the UE that are still actively taking part in the association.

In some cases, the method can include performing one or more of the following end-to-end edge application service continuity (E2E-EASC) operations that consider information for end-to-end AC associations: determining when a serving EAS is no longer able to provide service to one or more ACs defined within a given AC association; where determining may include: detecting one or more UEs, that host ACs defined within a given AC association, have left or are about to leave the service area of a serving EAS; detecting the serving EAS is no longer able to provide the required level of service (e.g., KPIs) for one or more ACs defined within a given AC association, or receiving a request from another entity in the system (e.g., AC, EEC, EES, EAS, ECS) to transition an AC association from the serving EAS to a targeted EAS; discovering and selecting an available targeted EAS that has a service profile that meets the AC association requirements (e.g., EAS service area, KPIs, schedule), if a targeted EAS is not available, triggering the instantiation of a targeted EAS that provides the type of application and/or services required by the AC association; scheduling and performing ACR operations to transition each of the ACs within the AC association to the targeted EAS such that the ACR operations are synchronized (i.e., start and end at the same time) and all the ACs are transitioned to the new targeted EAS in unison and that service interruption between the ACs is minimized, where scheduling and performing ACR operations can include sending ACR notifications to the EECs resident on the UEs hosting each of the ACs defined within a given AC association, where scheduling and performing ACR operations can include sending ACR notifications to the serving EAS and/or selected targeted EAS, where scheduling and performing ACR operations can include the network function itself performing the ACR operations, detecting the occurrence of ACR failures for one or more ACs defined within a given AC association and taking proper action such as notifying the other ACs in the association of the ACR failures or selecting and triggering a new round of ACRs to transition all the ACs to an alternative targeted EAS.

In some cases, the method can include updating end-to-end AC association information stored such that it reflects the ACR operation(s) that have been performed (e.g., new targeted EAS) such that the updated information may be later factored into edge application service continuity operations.

In some cases, the method can include sending notification(s) to applicable entities (e.g., ACs, EECs, EASs, EESs, ECSs) to notify them of the E2E-EASC operation(s) performed to transition the AC association to the targeted EAS.

The second main idea is that functionality resident on an edge node in the network (e.g., an edge server) that performs one or more of the following operations to enable end-to-end edge application service continuity between two or more ACs resident on different UEs that interact with one another via a common serving EAS: In some cases, the functionality on an edge node in the network may be a 3GPP SA6 defined EES, EAS, ECS or another function in the network. In some cases, the method can include receiving a request to establish, retrieve, update, or terminate an end-to-end association between two or more specified ACs that interact with one another through an application or service of a common EAS. In some cases, the request may originate from an 3GPP SA6 defined AC, EEC, EAS or another function in the system. In some cases, the request may include one or more of the following types of information: identifiers of specified types or instances of ACs applicable to the end-to-end association, identifiers for each UE hosting the ACs, identifiers for EECs on the hosting UEs, location information of the hosting UEs, interaction requirements of the ACs (e.g., schedule, QoS, etc.), and identifiers of one or more types or instances of EASs needed for the ACs to interact with one another. In some cases, the request may be a standalone request or the information may be embedded (e.g., piggybacked) in an existing request such as but not limited to a service provisioning, EEC registration, EAS discovery or ACR request.

In some cases, the method can include determining an AC association between two or more ACs is to be established, updated, or terminated. In some cases, this determination is based on receiving one or more AC association requests from an AC, ECS, EAS, EES or a function in an underlying 3GPP network, or by analyzing context information collected for one or more ACs such as detecting that ACs are communicating with the same EAS or the ACs are communicating with one another via services of an EAS.

In some cases, the method can include establishing, retrieving, updating, or terminating an end-to-end association between the two or more specified ACs. In some cases, establishing the association may include one or more of the following operations: determining conditions for establishing a new association between ACs have been met (e.g., ACs receiving services from the same EAS), triggering the instantiation of one or more EASs that provide the type of application or service required by the specified ACs, selecting one or more EASs that provide the type of application or service required by the specified ACs and that have a service coverage area that spans the locations of the UEs hosting the specified ACs or that have availability to meet the interaction requirements of the specified ACs, storing the end-to-end AC association information elements such that they may be later factored into edge application service continuity operations, and sending a notification of the association to the one or more selected EASs and/or applicable ACs. In some cases, updating an existing association may include one or more of the following operations: updating end-to-end AC association information stored for the association with information elements included in the request or determined while processing the request (e.g., selection of a new EAS) such that it may be later factored into edge application service continuity operations, and performing E2E-EASC operations if required.

In some cases, terminating the association may include one or more of the following operations: determining conditions for terminating an association between ACs have been met, removing any stored end-to-end AC association information for the association, and sending a notification of the terminated association to the one or more EASs associated with the association, where the notification may include information of the association.

In some cases, the method can include sending a response to a request to establish, retrieve, update or terminate an end-to-end association between two or more specified ACs where the response may include one or more of the following types of information: a status indication of whether the request was received and processed successfully, identifiers of one or more selected EASs, and modification (e.g., overrides) of information specified in the request (e.g., modifications made to the schedule, QoS, specified in the request).

In some cases, the method can include receiving a subscription request for AC association notifications. In some cases, the subscription request may originate from an 3GPP SA6 defined AC, EEC, EAS, or another function in the system. In some cases, the subscription can request notifications be sent if/when an association between AC(s) resident on the UE and AC(s) resident on other UE(s) has been established, updated, or terminated. In some cases, the subscription can request notifications be sent if/when a transition to a different serving EAS is required to maintain uninterrupted service to the associated ACs. In some cases, the subscription request may include one or more of the following types of information: identifier(s) of AC association(s), identifiers of specified types or instances of ACs applicable to the end-to-end association, identifiers for each UE hosting the ACs, identifiers for EECs on the hosting UEs, location information of the hosting UEs, interaction requirements of the ACs (e.g., schedule, QoS, etc.), identifiers of one or more types or instances of EASs needed for the ACs to interact with one another. In some cases, the request may be a separate standalone request or may be embedded (e.g., piggybacked) as information elements included within an existing request such as but not limited to an AC association, service provisioning, EEC registration, EAS discovery request or ACR request.

In some cases, the method can include sending an AC association notification. In some cases, the notification may target a 3GPP SA6 defined AC, EEC, EAS, or another function in the system. In some cases, the notification may indicate that an association between AC(s) resident on one UE and AC(s) resident on other UE(s) has been established, updated, or terminated. In some cases, the notification may indicate AC(s) resident on one UE require a transition to a different serving EAS to maintain uninterrupted service to the associated ACs. In some cases, the notification may include one or more of the following types of information: identifiers of specified types or instances of ACs applicable to the end-to-end association, identifiers for each UE hosting the ACs, location information of the hosting UEs, identifiers of one or more new targeted EESs and/or EASs that the local EEC and ACs must transition to using for continued interaction with the ACs on the other UEs.

In some cases, the method can include receiving a response to the notification that may include one or more of the following types of information: the targeted EAS and/or EES that were transitioned to, the results of any ACR operation(s) performed, and an updated list of ACs resident on the UE that are still actively taking part in the association.

In some cases, the method can include performing one or more of the following end-to-end edge application service continuity (E2E-EASC) operations that consider information for end-to-end AC associations: determining when a serving EAS is no longer able to provide service to one or more ACs defined within a given AC association; where determining may include: detecting one or more UEs, that host ACs defined within a given AC association, have left or are about to leave the service area of a serving EAS, detecting the serving EAS is no longer able to provide the required level of service (e.g., KPIs) for one or more ACs defined within a given AC association, or receiving a request from another entity in the system (e.g., AC, EEC, EES, EAS, ECS) to transition an AC association from the serving EAS to a targeted EAS, discovering and selecting an available targeted EAS that has a service profile that meets the AC association requirements (e.g., EAS service area, KPIs, schedule), if a targeted EAS is not available, triggering the instantiation of a targeted EAS that provides the type of application and/or services required by the AC association, scheduling and performing ACR operations to transition each of the ACs within the AC association to the targeted EAS such that the ACR operations are synchronized (i.e., start and end at the same time) and all the ACs are transitioned to the new targeted EAS in unison and that service interruption between the ACs is minimized, where scheduling and performing ACR operations can include sending ACR notifications to the EECs resident on the UEs hosting each of the ACs defined within a given AC association, where scheduling and performing ACR operations can include sending ACR notifications to the serving EAS and/or selected targeted EAS, where scheduling and performing ACR operations can include the network function itself performing the ACR operations, detecting the occurrence of ACR failures for one or more ACs defined within a given AC association and taking proper action such as notifying the other ACs in the association of the ACR failures or selecting and triggering a new round of ACRs to transition all the ACs to an alternative targeted EAS. updating end-to-end AC association information stored such that it reflects the ACR operation(s) that have been performed (e.g., new targeted EAS) such that the updated information may be later factored into edge application service continuity operations, and sending notification(s) to applicable entities (E.g., ACs, EECs, EASs, EESs, ECSs) to notify them of the E2E-EASC operation(s) performed to transition the AC association to the targeted EAS.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

BRIEF DESCRIPTION OF THE TABLES

An appendix of tables is included.
Table 1—E2E AC association context.
Table 2—Types of AC association discovery information.
Table 3—Types of collected AC association information.
Table 4—Types of AC association request operations.
Table 5—AC association request information.
Table 6—Types of E2E edge application service continuity (E2E-EASC) operations.
Table 7—AC association response information.
Table 8—AC association notification request information.
Table 9—Notification events and corresponding operations.
Table 10—AC association notification response information.
Table 11—Selected Abbreviates.
Table 12—Selected Terms.

DETAILED DESCRIPTION

Table 11 of the Appendix describes some of the abbreviations used herein. Table 12 of the Appendix describes certain terms used herein.

Existing 3GPP Edge Application Service Continuity Functionality

Edge Computing is a network architecture concept that enables cloud computing capabilities and service environments to be deployed close to user endpoint devices. It promises several benefits such as lower latency, higher bandwidth, reduced backhaul traffic and prospects for new services compared to cloud environments.

3GPP TS 23.558 SA6 defines an Architecture for Enabling Edge Applications (EDGEAPP.)

The EDGEAPP architecture defines an edge enabler layer comprising several edge computing centric functions and procedures to enable edge applications to function over top of 3GPP networks.

Figure 1:
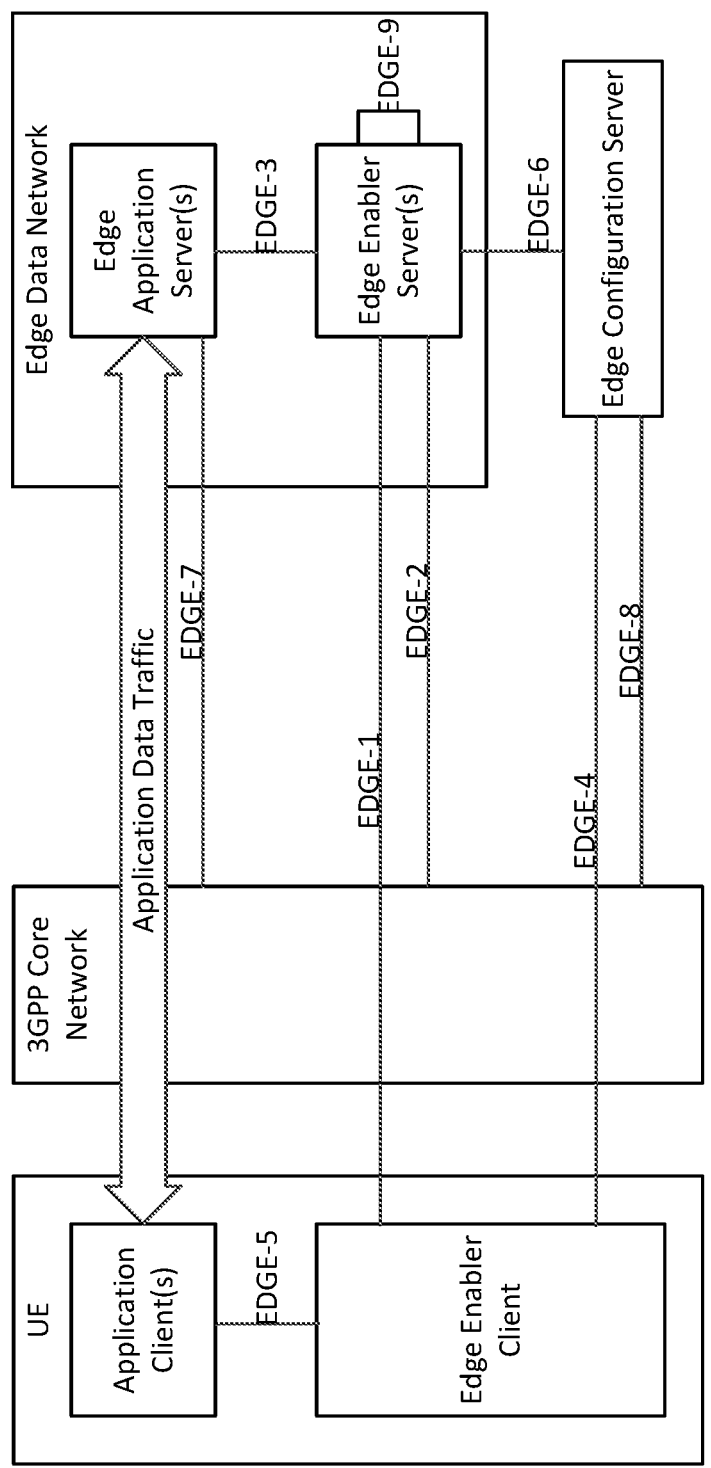
FIG. 1 depicts 3GPP SA6 edge enabler layer architecture.

FIG. 1 illustrates an example 3GPP SA6 edge enabler layer architecture. As shown in FIG. 1, the edge enabler layer functions defined by the EDGEAPP architecture include an Edge Enabler Client (EEC) resident on the UE and Edge Enabler Servers (EES) and Edge Configuration Servers (ECS) resident on edge nodes within the network. The functions of this edge enabler layer enable Application Clients (ACs) resident on the UE to access and use services offered by Edge Application Servers (EASs) resident on edge nodes in the network. The EDGEAPP architecture defines the functionality of each of the edge enabler layer functions their interactions with one another over the EDGEAPP defined reference points (i.e., EDGE-1 thru EDGE-9).

Figure 2:
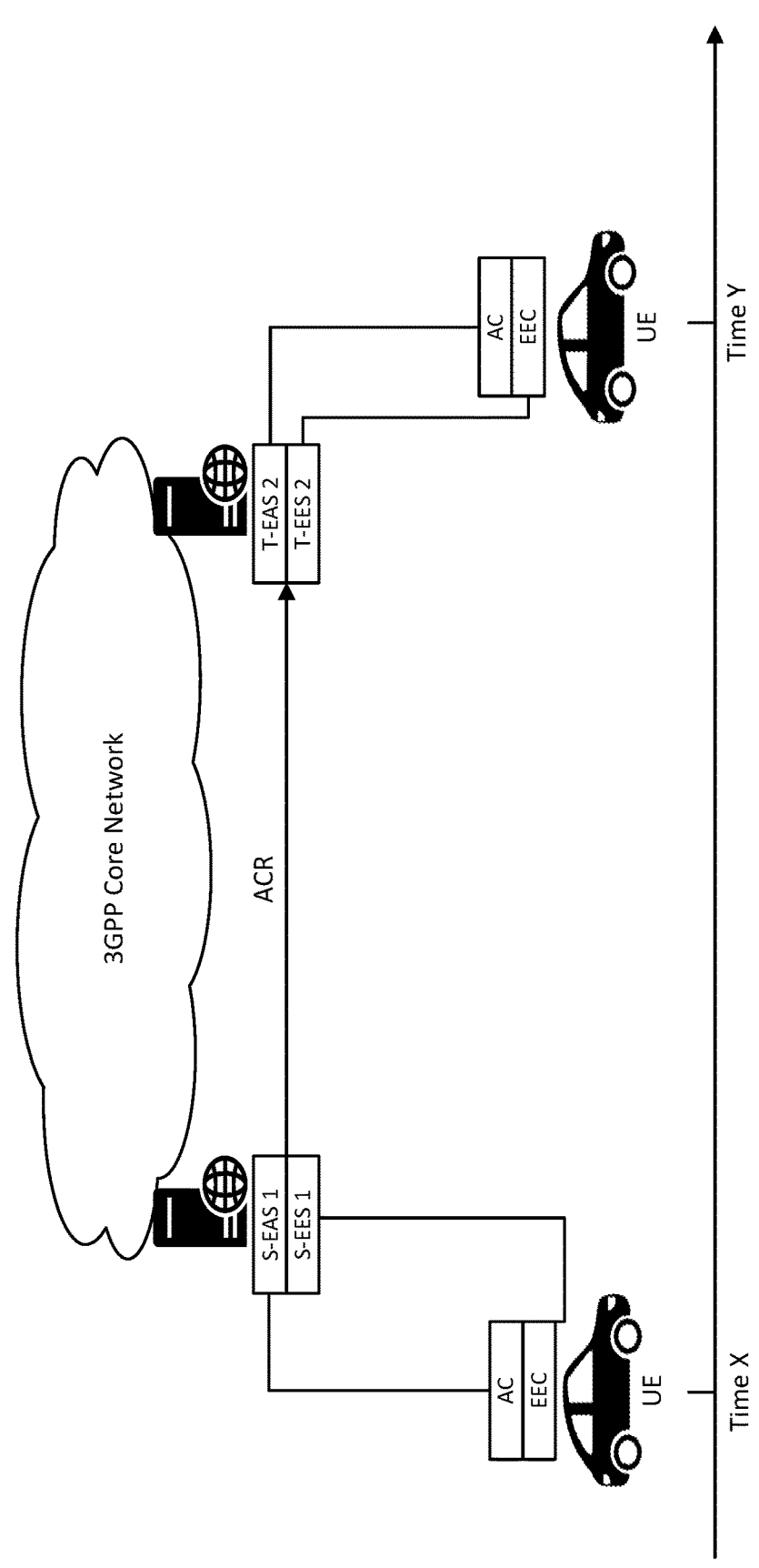
FIG. 2 depicts 3GPP SA6 edge application service continuity.

When a UE moves to a new location, different EASs located at different edge network locations may be more suitable for serving the ACs resident on the UE. Such transitions can also result from a non-mobility event, for example, an EAS becomes overloaded or no longer available to service an AC. These types of scenarios require support from the edge enabler layer to maintain continuity of the service between an AC and the EAS that it is using. Edge application service continuity in the context of the SA6 defined edge enabler layer, is functionality that enables and assists with transitioning an AC from a serving EAS (S-EAS) to a targeted EAS (T-EAS) with minimal or no interruption of service to the AC as shown in FIG. 2. Supporting edge application service continuity in this context, requires several types of functionality such as relocating context information of an AC and EEC resident on the UE from a S-EES and S-EAS that are currently serving the AC and EEC to a targeted EES and EAS that the AC and EEC are transitioning to. SA6 refers to this process as Application Context Relocationing (ACR) which is supported by the different SA6 edge enabler layer defined entities.

Example Challenges

The current SA6 Application Context Relocationing (ACR) procedures lack support for end-to-end edge application service continuity use cases involving two or more ACs resident on different UEs that interact with one another through the services provided by a common (e.g., the same) EAS. This is an important use case for scenarios such as but not limited to multi-player real-time interactive gaming or smart robot interaction for industrial automation scenarios. For example, gamers interact with one another using their gaming ACs resident on their respective UEs which in turn interface to an EAS hosted at the edge of the network. These types of use cases are good candidates for edge-based computing since they can require low latency, tight synchronization and/or high bandwidth communication. However, low latency, tight synchronization and high bandwidth communication is not just required between an AC and an EAS, but rather it is required end-to-end between the ACs that are interacting with one another. For this reason, it is desirable and often required that the ACs interact with one another via a common EAS to reduce end-to-end lag and maintain synchronization between the ACs (e.g., gamers).

End-to-end edge application service continuity for these types of use cases is more complex. For example, if one UE moves independent of other UEs and transitions to a different EAS, then maintaining end-to-end edge application service continuity between the ACs on the different UEs can become very challenging.

Figure 3:
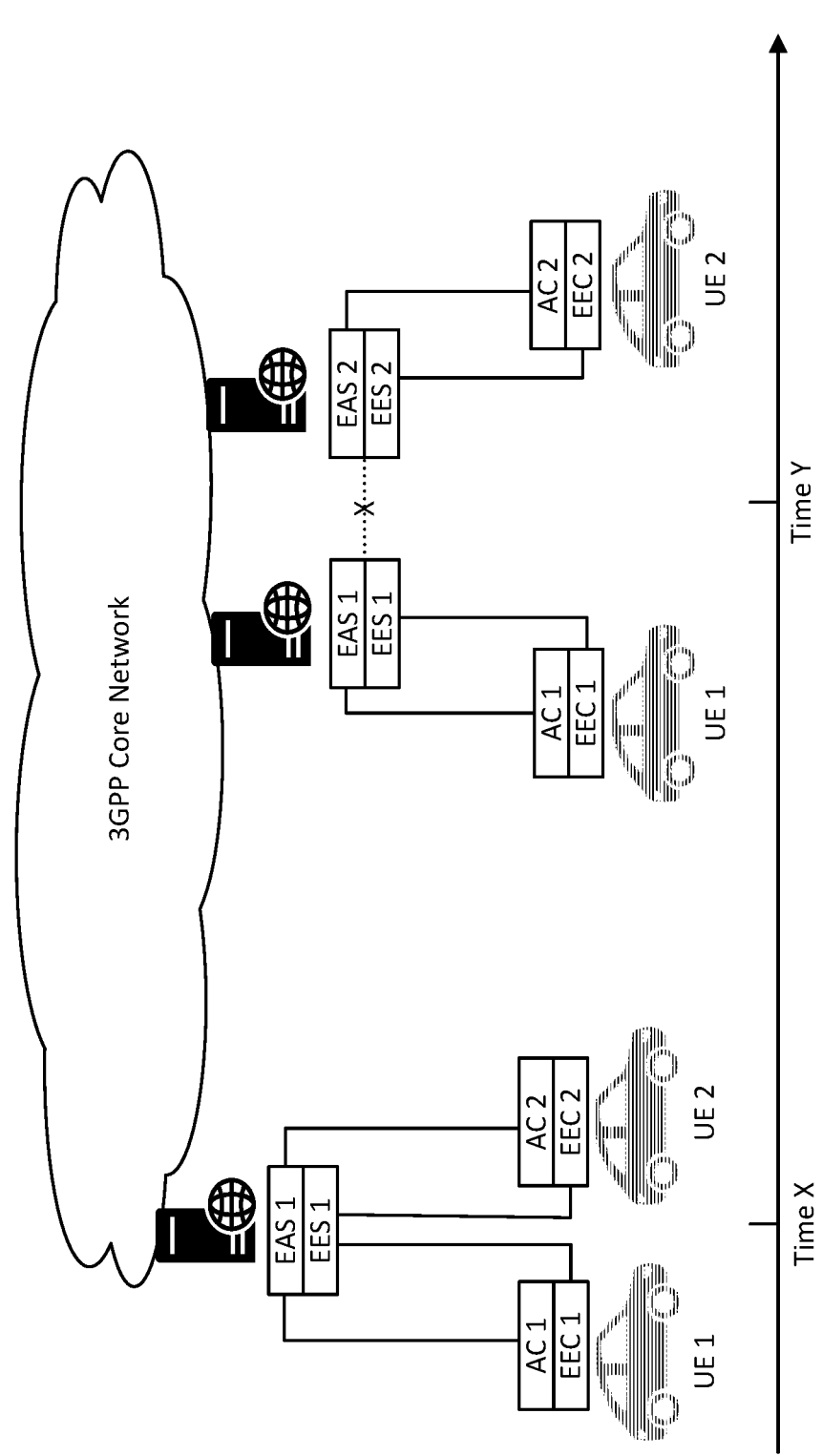
FIG. 3 depicts example E2E-EASC shortcomings of 3GPP SA6 edge application service continuity.
Figure 4:
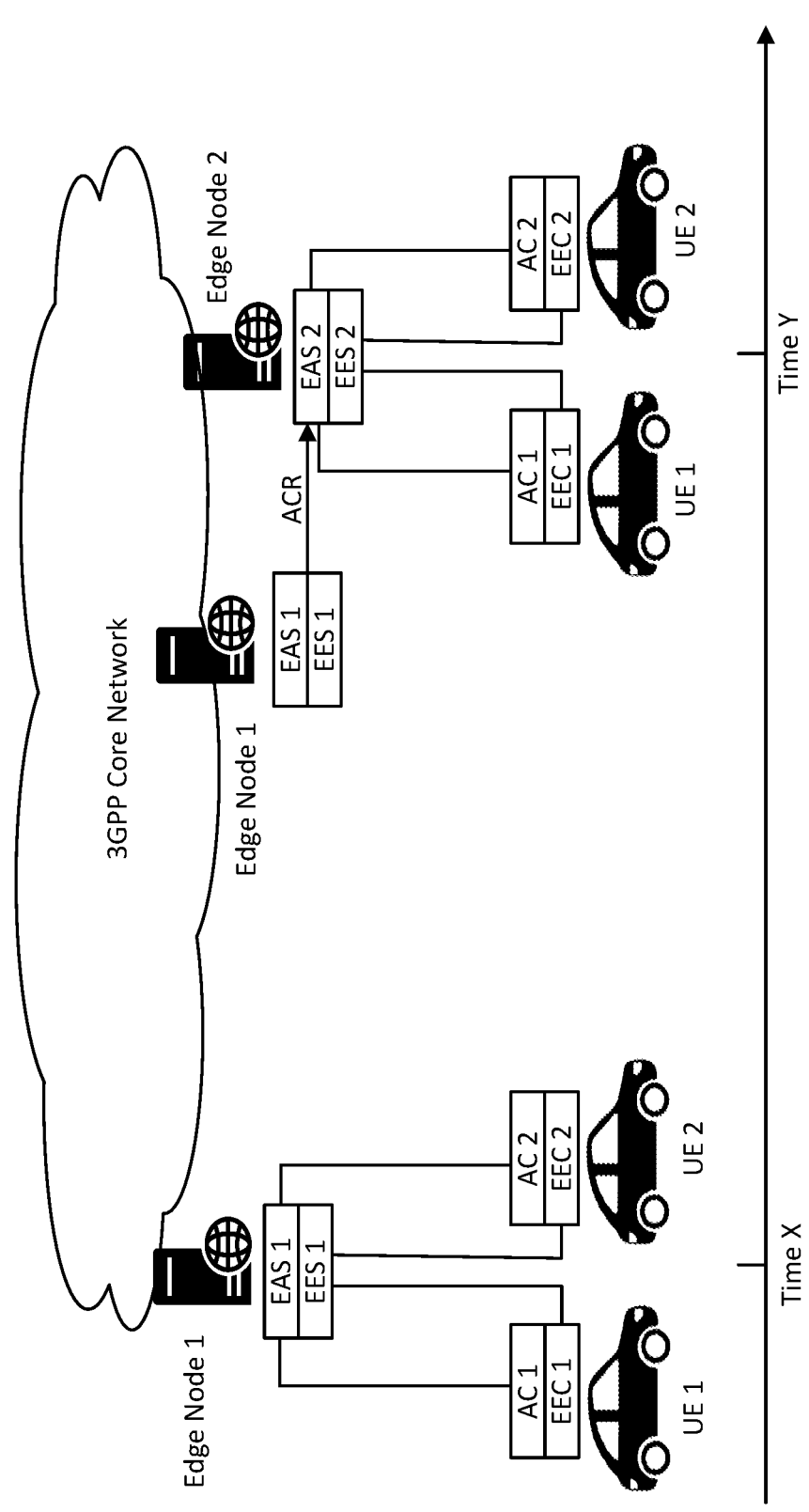
FIG. 4 depicts E2E-EASC Service continuity.

For example, FIG. 3 illustrates a use case in which AC 1 is resident on UE 1 and AC 2 is resident on UE 2. At time X, AC 1 and AC 2 interact with one another via the services of a common EAS 1. At time Y, UE 2 moves out of the service area of EAS 1 which results in a transition of AC 2 from using services of EAS 1 to using services of EAS 2. After this occurs, AC 1 and AC 2 are no longer using a common EAS and hence any interaction between AC 1 and AC 2 requires coordination between multiple EASs. This coordination between EASs can introduce significant overhead (e.g., latency and jitter) resulting in lag and synchronization issues between AC 1 and AC2 which lessens the benefits and effectiveness of using edge computing. In the current SA6 defined edge enabler layer there is a lack of support for ensuring two or more ACs that are resident on different UEs and that are interacting with one another, do so through a common EAS if/when required to meet AC use case requirements.

Example Solutions

To enable ACs to continue to interact with one another through a common serving EAS, even if a transition to a new EAS is required by one or more of the ACs, end-to-end edge application service continuity (E2E-EASC) functionality is proposed. If/when a trigger condition (e.g., a UE moves or a serving EAS becomes overloaded or unavailable) is detected that requires a transition of one or more ACs from an existing serving EAS to a new serving EAS, the proposed functionality ensures that all the ACs that are interacting with one another, via the existing serving EAS, are transitioned together in unison to a new serving EAS. This ensures that that interaction between the two or more ACs can continue with minimal or no interruption and thus enabling E2E-EASC.

One skilled in the art will recognize that the E2E-EASC functionality proposed in this invention can also be used to enable ACs to continue to interact with one another if a transition from an Edge Application Server (EAS) to a Cloud Application Server (CAS) is required or vice versa. For example, ACs that are interacting with one another via a CAS may require a transition to an EAS to meet more aggressive latency requirements such as a performing latency critical task for a designated period of time. Likewise, ACs that are interacting with one another via an EAS may require a transition to an CAS for scenarios such as one involving a high-rate speed or a lack of available EASs to transition to.

E2E-EASC Functionality

Figure 5:
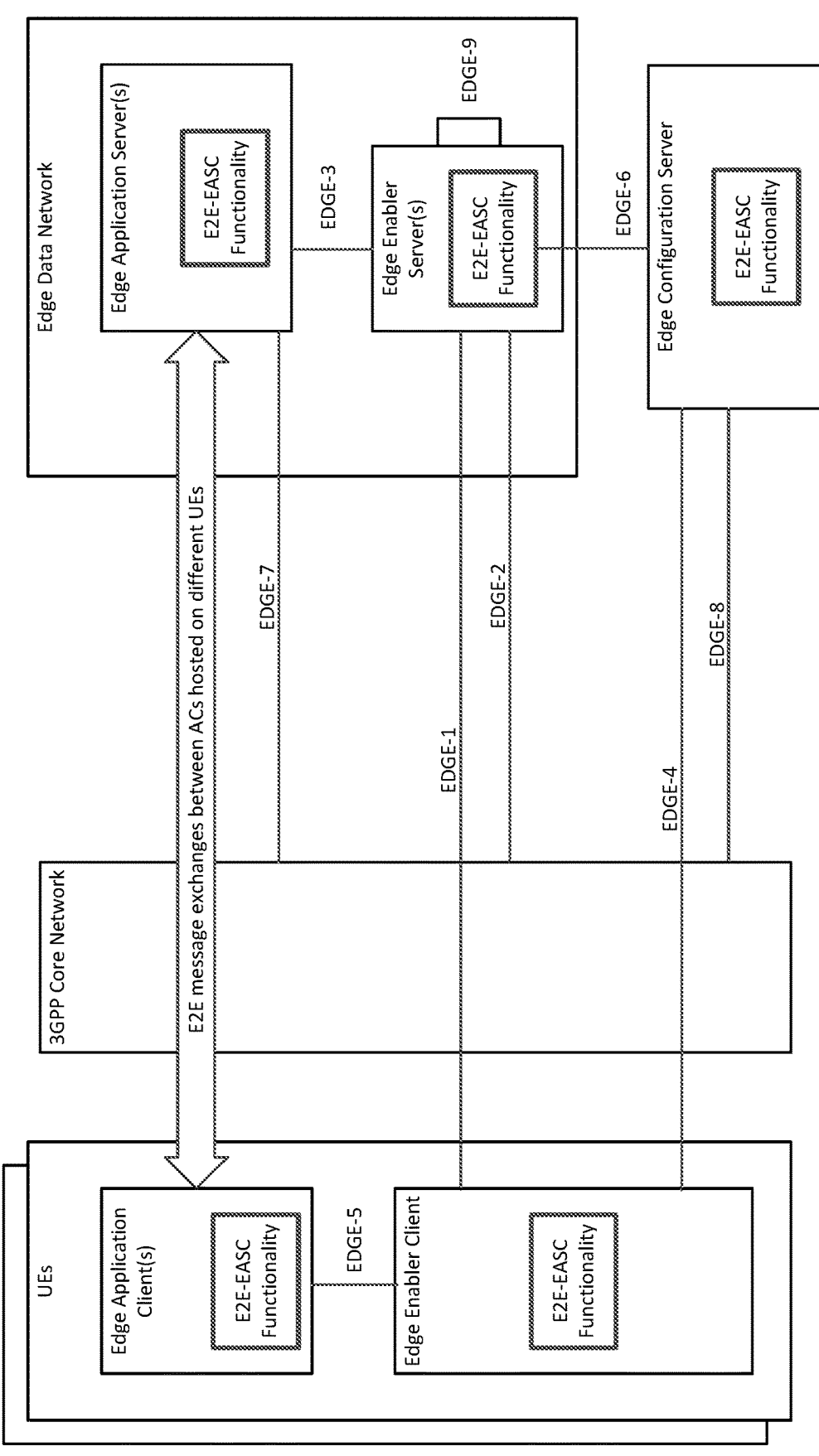
FIG. 5 depicts E2E AC Service Continuity Enhancements to 3GPP SA6 Edge Enabler Layer.

To enable end-to-end edge application service continuity (E2E-EASC), several enhancements are proposed to the 3GPP SA6 edge enabler layer. As shown in FIG. 5, E2E-EASC functionality is proposed for Application Clients, 11                                                          12

Edge Enabler Client, Edge Enabler Servers, Edge Configuration Servers, and Edge Application Servers.

One skilled in the art will recognize that although not explicitly stated in the sections hereafter, that occurrences of the term Edge Application Server (EAS) can be used interchangeability with Cloud Application Server (CAS) such that the procedures and functionality described for an EAS can also apply to a CAS.

The scenarios in the following clauses differ with regards to which 3GPP SA6 edge enabler layer functions in the system initiate E2E-EASC related requests and which entities in the system functions receive and process these requests. One skilled in the art will recognize that typical implementations will support different combinations and/or a subset of these scenarios based on deployment considerations.

E2E-EASC Information Elements—AC Associations

3GPP SA6 currently lacks support to define E2E associations between ACs that interact with one another through the use of applications/services of a shared EAS that is serving and enabling the interaction between the ACs. This invention proposes several new information elements to enable the definition of such E2E associations between ACs. These information elements are captured in Table 1 of the Appendix. Each individual association between ACs can be defined by a separate instance/collection of the E2E AC association context defined in Table 1 of the Appendix.

EDGE-5 E2E-EASC Procedures

An AC and EEC may interact with one another over the EDGE-5 reference point shown in FIG. 5 to perform the following types of E2E-EASC operations.

AC Initiated AC Association Requests

Figure 6:
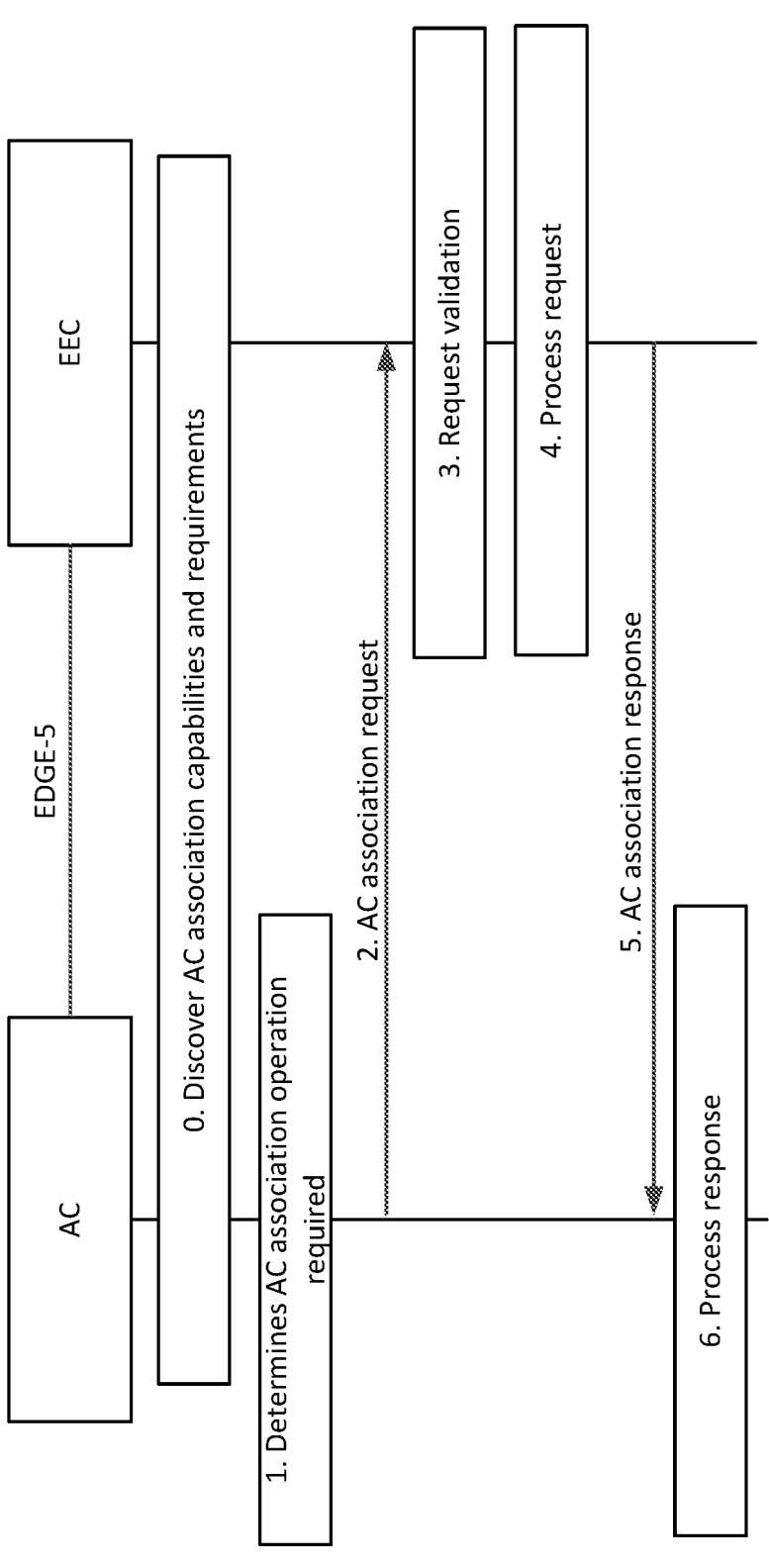
FIG. 6 depicts AC initiated EDGE-5 AC association request.

An AC may initiate an AC association request to an EEC over the EDGE-5 reference point as shown in FIG. 6.

Step 0—An AC and EEC may exchange AC association discovery information. This exchange may take place via one or more messages dedicated to the exchange of AC association discovery information. Alternatively, this exchange may be piggybacked within existing request or response messages exchanged between an AC and EEC. For example, a registration, discovery, subscription or notification request or response exchanged between an AC and EEC. AC association discovery information may include one or more elements defined in Table 2 of the Appendix. Using this AC association discovery information, an AC and/or EEC may indicate and/or detect AC association requirements, AC association capabilities, whether AC association functionality is enabled or not, and/or the privileges of edge enabler layer functions to initiate and/or perform AC association operations. Based on this exchange of AC association discovery information, an AC and/or EEC may determine whether to initiate and/or process subsequent AC association requests.

Step 1—An AC may determine that a particular type of AC association operation is required for a new or existing AC association such as but not limited to the types of operations defined in Table 4 of the Appendix. The AC may also determine the identities of one or more other ACs applicable to the AC association request. For example, these determinations may be based on input from users interacting with the AC or the UE that the AC is resident upon. For example, a user may provide the identity of another user, AC or UE that it would like to establish an association with (e.g., an online gaming session, a remote surgery session, etc.). Alternatively, these determinations may be based on information that the AC collects based on its interaction with other entities in the system such as one or more EASs, EESs, ECSs, ACs. This collected information may include but is not limited to the types of information defined in Table 3 of the Appendix. An AC may also discover other ACs by issuing an AC discovery request to the EEC (not show in in FIG. 6).

Step 2—The AC sends an AC association request to the EEC. This request may be a separate standalone request as shown in FIG. 6. Alternatively, an AC association operation may be embedded (i.e., piggybacked) within another request that the AC issues to the EEC (not shown in FIG. 6). The type of request operations that may be performed on an AC association are defined in Table 4 of the Appendix. Based on the type of request operation, the request may include one or more of the information elements defined in Table 5 of the Appendix.

Step 3—The EEC receives the request and performs validity checks on the request. The validity checks may include checking that the format and structure of the received request comprises only valid information permitted for the particular type of AC association request. The validity checks may also include checking whether the requesting AC is authorized to perform the type of AC association request that is received. The validity check may also include checking whether the requesting AC is permitted to be associated with the one or more ACs specified in the received request. The validity check may also include checking whether an AC association referenced in the request is invalid for the type of request (e.g., an AC association already exists or is in the process of being created which conflicts with this request).

Step 4—If the received request is successfully validated, the EEC processes the AC association request. Based on the type of operation specified in the request, the EEC may perform one or more of the following actions either autonomously or by interacting with one or more functions in the network (e.g., by sending AC association requests to functions in the network):

Establish AC association(s)—The EEC may issue one or more requests to EES(s) and/or ECS(s) in the system to discover EASs matching the requirements of the AC association. The EEC may also share AC association information with EES(s) and/or ECS(s) by sending AC association requests to these entities or by including it within registration or service provisioning requests that are sent to EES(s) and ECS(s). Once the AC association has been established, the EEC may trigger and/or perform one or more of the E2E-EASC operations defined in Table 6 of the Appendix. The EEC may perform these operations autonomously or by coordinating with other entities in the system (e.g., EESs, EECs, ECSs, EASs, ACs).

Update AC association(s)—The EEC may update locally stored AC association information stored for the association with information elements included in the request or determined while processing the request (e.g., selection of a new EAS) such that it may be later factored into edge application service continuity operations. The EEC may also share updated AC association information with EES(s) and/or ECS(s) by sending AC association requests to these entities or by including it within registration or service provisioning requests that are sent to EES(s) and ECS(s). Once the AC association has been updated, the EEC may trigger and/or perform one or more of the E2E-EASC operations defined in Table 6. The EEC may perform these operations autonomously or by coordinating with other entities in the system (e.g., EESs, EECs, ECSs, EASs, ACs).

Terminate AC association(s)—The EEC may remove AC association information from EES(s) and/or ECS(s) by sending AC association requests to these entities or by removing it via registration or service provisioning update requests that are sent to EES(s) and ECS(s). The EEC may determine that a transition of one or more ACs (but not all the ACs) to a different EAS requires terminating the AC association if all the ACs are no longer able to interact with one another via a shared EAS. The EEC may remove locally stored AC association information elements. The EEC may send a notification of the terminated association to one or more EASs and/or applicable ACs.

Discover AC association(s)—The EEC may examine locally stored AC association information to determine if any AC associations meet the AC association discovery criteria specified by the requesting AC. The EEC may also issue one or more requests to EES(s), ECS(s), EAS(s), or other EEC(s) in the system to discover existing AS associations based on discovery criteria specified by the requesting AC.

Subscribe to AC association(s)—The EEC may store the AC association notification criteria and notification address specified in the subscription request. The EEC may monitor and detect when events satisfying the notification criteria have been met such as a transition to a different serving EAS is required to maintain an existing AC association, a new AC association has been established, an existing AC association has been updated, an existing AC association has been terminated. If when conditions of a notification criteria have been met, the EEC may send a notification to the notification addresses.

Invite an AC to join an AC association—The EEC may send invitation request(s) to one or more ACs to invite them to join an AC association with other ACs. The EEC may in turn receive response(s) back indicating whether the ACs accept or reject the invitation.

Relocate AC association context—The EEC may relocate AC association context information to another edge enabler layer function. For example, an EES, ECS or EAS. This may occur as part of another operation such as an ACR or EEC context relocation operation.

Step 5—The EEC may return a response to the requesting AC. Based on the type of AC association request operation, the response may include one or more of the information elements defined in Table 7 of the Appendix.

Figure 7:
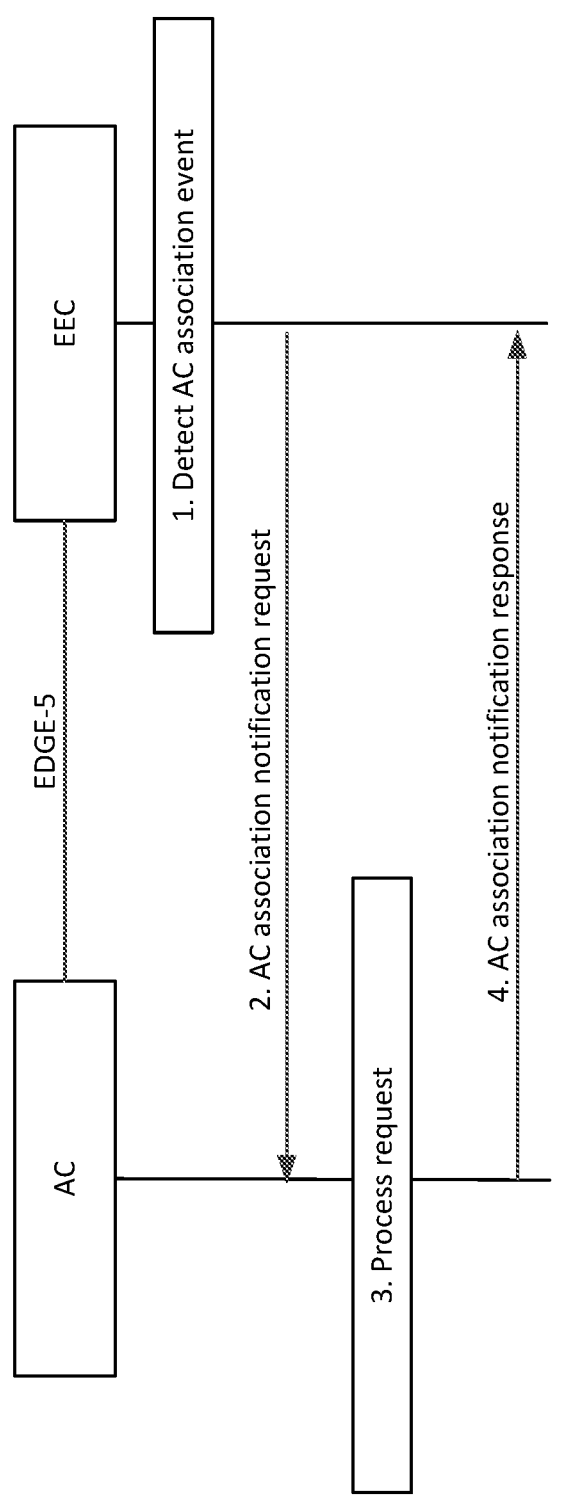
FIG. 7 depicts EEC initiated EDGE-5 AC association notifications.

Step 6—The AC processes the response. Based on the type of AC association request operation and the information contained in the response, the AC may perform one or more subsequent operations such as but not limited to the following:

The AC may start interacting with other ACs that it now has an established AC association with The AC may adjust its interaction with other ACs based on updates made to an existing AC association The AC may stop interacting with ACs that it no longer has an AC association with The AC may initiate the establishment of AC association if no AC associations meeting its requirements were discovered The AC may initiate an AC association invitation requests for one or more ACs The AC may initiate a request to establish an AC association with AC(s) that accepted an AC association invitation The AC may initiate a request to update a discovered AC association The AC may initiate a request to terminate a discovered AC association The AC may start listening for notifications for an AC association subscription that was successfully created EEC Initiated AC Association Notification Requests An EEC may initiate an AC association notification request to an AC over the EDGE-5 reference point as shown in FIG. 7.

Step 1—An EEC detects the occurrence of an AC association event. The EEC may monitor notification criteria specified in one or more AC association subscriptions to determine event conditions of interest to an AC. The EEC may then monitor the criteria associated with these events of interest to detect if/when they have been met. Alternatively, an EEC may receive a notification from another entity in the network (e.g., EES, EAS, ECS) signaling an AC association event to the EEC.

Step 2—The EEC sends an AC association notification request to the AC. This notification may be a separate standalone request as shown in FIG. 7. Alternatively, an AC association notification may be embedded (i.e., piggy-backed) within another request that the EEC issues to the AC (not shown in FIG. 7). The request may include one or more of the information elements defined in Table 8 of the Appendix.

Step 3—The AC receives the AC association notification request and performs validity checks on the request. The validity checks may include checking that the format and structure of the received notification request comprises only valid information permitted for the particular type of notification request. The validity checks may also include checking the AC association subscription identifier to determine whether the AC is interested in receiving notifications associated with this subscription (e.g., it is a subscription that the AC created and not another AC). The validity check may also include checking whether the AC is able and willing to perform the requested actions specified in the notification. The validity check may also include checking whether an AC association referenced in the request is invalid for the type of request (e.g., an AC association already exists or is in the process of being created which conflicts with this request).

Step 4—If the received AC association notification request is successfully validated, the AC processes the request. Based on the type of event specified in the notification request, the AC may perform one or more of the following operations defined in Table 9 of the Appendix. When performing these operations, the AC may make use of information included within the notification request defined in Table 8 of the Appendix.

Step 5—The AC returns a response to the requesting EEC. Based on the type of event and action specified in the notification request, the response may include one or more of the information elements defined in Table 10 of the Appendix.

EDGE-1 and EDGE-4 E2E-EASC Procedures

An EEC may perform the following types of E2E-EASC operations with an EES over the EDGE-1 reference point or an ECS over the EDGE-4 reference point shown in FIG. 5.

EEC Initiated AC Association Requests

Figure 8:
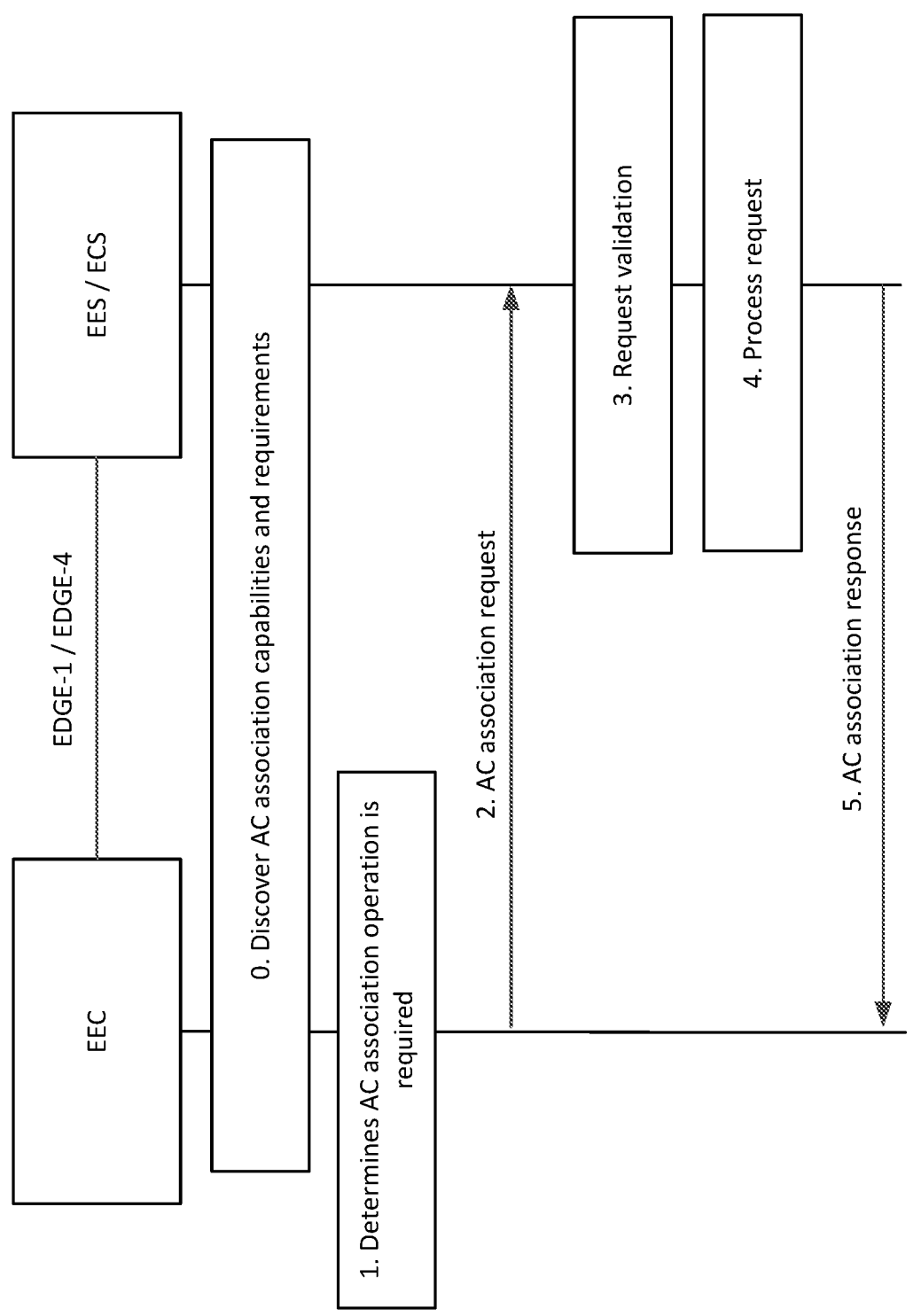
FIG. 8 depicts EEC initiated EDGE-1 or EDGE-4 AC association request.

An EEC may initiate AC association requests to an EES over the EDGE-1 reference point or to an ECS over the EDGE-4 reference point as shown in FIG. 8.

Step 0—An EEC and EES/ECS may exchange AC association discovery information. This exchange may take place via one or more messages dedicated to the exchange of AC association discovery information. Alternatively, this exchange may be piggybacked within existing request or response messages exchanged between an EEC and EES/

ECS. For example, a registration, provisioning, discovery, subscription or notification request or response exchanged between an EEC and EES/ECS. AC association discovery information may include one or more elements defined in Table 2 of the Appendix. Using this AC association discovery information, an EEC and/or EES/ECS may indicate and/or detect AC association requirements, AC association capabilities, whether AC association functionality is enabled or not, and/or the privileges of edge enabler layer functions to initiate and/or perform AC association operations. Based on this exchange of AC association discovery information, an EEC and/or EES/ECS may determine whether to initiate and/or process subsequent AC association requests.

Step 1—An EEC may determine that a particular type of AC association operation is required for a new or existing AC association such as but not limited to the types of operations defined in Table 4 of the Appendix. The EEC may make this determination based on receiving one or more AC association requests or service continuity requests from ACs resident on the same UE as the EEC, receiving AC association requests from one or more other entities in the network such as but not limited to an ECS, EES or a function in an underlying 3GPP network. An EEC may also make this determination based on other means such as analyzing information that it collects from one or more ACs such as but not limited to the information specified in Table 3 of the Appendix and/or the interaction patterns of ACs which it monitors. For example, information regarding the message exchanges between an AC resident on the UE and one or more EASs and/or other ACs in the system and detecting that ACs are communicating with the same EAS or the ACs are communicating with one another via services of an EAS. Information such as but not limited to identifiers of EASs, identifiers of ACs, types of operations performed, schedule or frequency of operations.

Step 2—The EEC sends an AC association request(s) to an EES and/or ECS. Each request may be sent as a stand-alone AC association request as shown in FIG. 8. Alternatively, this information may be piggy-backed and carried within another message (not shown in FIG. 8). For example, AC association information may be included in one or more information elements contained within an EEC registration, EAS discovery or ACR request that the EEC sends to an EES or a service provisioning request that the EEC sends to an ECS. In either case, the information included in the dedicated or piggy-backed request may include one or more of the information elements specified in Table 4 and/or Table 5 of the Appendix.

Step 3—The EES or ECS receives the request and performs validity checks on the request. The validity checks may include checking that the format and structure of the received request comprises only valid information permitted for the particular type of AC association request. The validity checks may also include checking whether the requesting EEC is authorized to perform the type of AC association request that is received. The validity check may also include checking whether the ACs specified in the received request are permitted to be associated with one another. The validity check may also include checking whether an AC association referenced in the request is invalid for the type of request (e.g., an AC association already exists or is in the process of being created which conflicts with this request).

Step 4—If the received request is successfully validated, the EES or ECS processes the AC association request. Based on the type of operation specified in the request, the EES or ECS may perform one or more of the following actions:

Establish AC association(s)—The EES or ECS may issue one or more requests to EES(s) and/or ECS(s) in the system to discover EASs matching the requirements of the AC association. The EES or ECS may also share AC association information with other EES(s) and/or other ECS(s) by sending AC association requests to these entities. Once the AC association has been established, the EES or ECS may trigger and/or perform one or more of the E2E-EASC operations defined in Table 6 of the Appendix. The EES or ECS may perform these operations autonomously or by coordinating with other entities in the system (e.g., EESs, EECs, ECSs, EASs, ACs).

Update AC association(s)—The EES or ECS may update locally stored AC association information stored for the association with information elements included in the request or determined while processing the request (e.g., selection of a new EAS) such that it may be later factored into edge application service continuity operations. The EES or ECS may also share updated AC association information with other EES(s) and/or other ECS(s) by sending AC association requests to these entities. Once the AC association has been updated, the EES or ECS may trigger and/or perform one or more of the E2E-EASC operations defined in Table 6 of the Appendix. The EES or ECS may perform these operations autonomously or by coordinating with other entities in the system (e.g., EESs, EECs, ECSs, EASs, ACs).

Terminate AC association(s)—The EES or ECS may remove locally stored AC association information and/or send AC association requests to other EES(s) and/or other ECS(s) to remove AC association information from these entities. The EES or ECS may determine that a transition of one or more ACs (but not all the ACs) to a different EAS requires terminating the AC association. The EES or ECS may send a notification of the terminated association to one or more EASs and/or applicable ACs.

Discover AC association(s)—The EES or ECS may examine locally stored AC association information to determine if any AC associations meet the AC association discovery criteria specified by the requesting AC. The EES or ECS may also issue one or more requests to other EES(s), other ECS(s), EAS(s), or EEC(s) in the system to discover existing AS associations based on discovery criteria specified by the requesting AC.

Subscribe to AC association(s)—The EES or ECS may store the AC association notification criteria and notification address specified in the subscription request. The EES or ECS may monitor and detect when events satisfying the notification criteria have been met such as a transition to a different serving EAS is required to maintain an existing AC association, a new AC association has been established, an existing AC association has been updated, an existing AC association has been terminated. If when conditions of a notification criteria have been met, the EES or ECS may send a notification to the notification addresses.

Invite an AC to join an AC association—The EES or ECS may send invitation request(s) to one or more ACs to invite them to join an AC association with other ACs. The EEC may in turn receive a response(s) back indicating whether the ACs accept or reject the invitation.

Relocate AC association context—The EES or ECS may relocate AC association context information to another edge enabler layer function. For example, another EES or ECS or an EEC or EAS. This may occur as part of another operation such as an ACR or EEC context relocation operation.

Step 5—The EES or ECS returns a response to the requesting EEC. Based on the type of request operation, the response may include one or more of the information elements defined in Table 7 of the Appendix.

EES ECS Initiated Requests

EES ECS Initiated AC Association Requests

Figure 9:
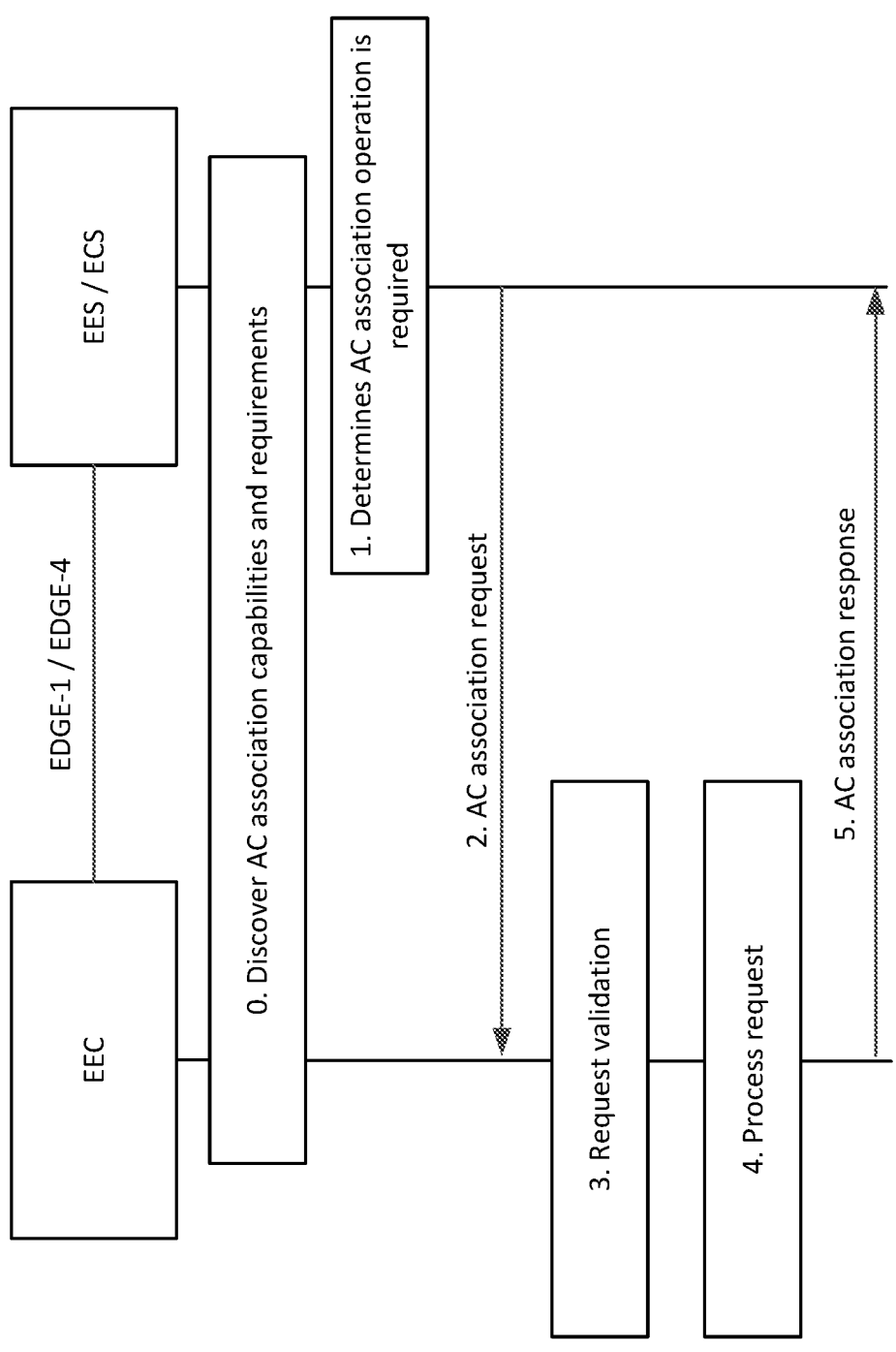
FIG. 9 depicts EES/ECS initiated EDGE-1/EDGE-4 AC association request.

An EES/ECS may initiate AC association requests to an EEC over the EDGE-1/EDGE-4 reference point as shown in FIG. 9.

Step 0—An EES/ECS and EEC may exchange AC association discovery information. This exchange may take place via one or more messages dedicated to the exchange of AC association discovery information. Alternatively, this exchange may be piggybacked within existing request or response messages exchanged between an EES/ECS and EEC. For example, a registration, provisioning, discovery, subscription or notification request or response exchanged between an EES/ECS and EEC. AC association discovery information may include one or more elements defined in Table 2 of the Appendix. Using this AC association discovery information, an EES/ECS and/or EEC may indicate and/or detect AC association requirements, AC association capabilities, whether AC association functionality is enabled or not, and/or the privileges of edge enabler layer functions to initiate and/or perform AC association operations. Based on this exchange of AC association discovery information, an EES/ECS and/or EEC may determine whether to initiate and/or process subsequent AC association requests.

Step 1—An EES/ECS may determine that a particular type of AC association operation is required for a new or existing AC association such as but not limited to the types of operations defined in Table 4 of the Appendix. The EES/ECS may make this determination based on receiving one or more AC association requests or service continuity requests from one or more other entities in the network such as but not limited to an AC, EEC, ECS, EES or a function in an underlying 3GPP network. An EES/ECS may also make this determination based on other means such as analyzing information that it collects such as but not limited to the information specified in Table 3 of the Appendix and/or the interaction patterns of ACs and EASs which it monitors. For example, information regarding the message exchanges between an AC and one or more EASs and/or other ACs in the system and detecting that ACs are communicating with the same EAS or the ACs are communicating with one another via services of an EAS. Information such as but not limited to identifiers of EASs, identifiers of ACs, types of operations performed, schedule or frequency of operations.

Step 2—The EES/ECS sends an AC association request(s) to an EEC. Each request may be sent as a standalone AC association request as shown in FIG. 9. Alternatively, this information may be piggy-backed and carried within another message (not shown in FIG. 9). For example, AC association information may be included in one or more information elements contained within a notification or ACR request or response that the EES/ECS sends to an EEC. In either case, the information included in the dedicated or piggy-backed request or response may include one or more of the information elements specified in Table 4 and/or Table 5 of the Appendix.

Step 3—The EEC receives the request and performs validity checks on the request. The validity checks may include checking that the format and structure of the received request comprises only valid information permitted for the particular type of AC association request. The validity checks may also include checking whether the requesting EES/ECS is authorized to perform the type of AC association request that is received. The validity check may also include checking whether the ACs specified in the received request are permitted to be associated with one another. The validity check may also include checking whether an AC association referenced in the request is invalid for the type of request (e.g., an AC association already exists or is in the process of being created which conflicts with this request).

Step 4—If the received request is successfully validated, the EEC processes the AC association request. Based on the type of operation specified in the request, the EEC may perform one or more of the following actions:

Establish AC association(s)—The EEC may issue one or more requests to EES(s) and/or ECS(s) in the system to discover EASs matching the requirements of the AC association. The EEC may also share AC association information with other EEC(s) and/or EES(s) or ECS(s) by sending AC association requests to these entities. Once the AC association has been established, the EEC may trigger and/or perform one or more of the E2E-EASC operations defined in Table 6 of the Appendix. The EEC may perform these operations autonomously or by coordinating with other entities in the system (e.g., EESs, EECs, ECSs, EASs, ACs).

Update AC association(s)—The EEC may update locally stored AC association information stored for the association with information elements included in the request or determined while processing the request (e.g., selection of a new EAS) such that it may be later factored into edge application service continuity operations. The EEC may also share updated AC association information with other EEC(s) and/or EES(s) or ECS(s) by sending AC association requests to these entities. Once the AC association has been updated, the EEC may trigger and/or perform one or more of the E2E-EASC operations defined in Table 6 of the Appendix. The EEC may perform these operations autonomously or by coordinating with other entities in the system (e.g., EESs, EECs, ECSs, EASs, ACs).

Terminate AC association(s)—The EEC may remove locally stored AC association information and/or send AC association requests to other EEC(s) and/or EES(s) or ECS(s) to remove AC association information from these entities. The EEC may determine that a transition of one or more ACs to a different EAS is required to terminate the AC association and in turn initiate one or more ACR operations. The EEC may send a notification of the terminated association to one or more EASs and/or applicable ACs.

Discover AC association(s)—The EEC may examine locally stored AC association information to determine if any AC associations meet the AC association discovery criteria specified by the requesting AC. The EEC may also issue one or more requests to other EEC(s), EES(s) or ECS(s), or EAS(s) in the system to discover existing AS associations based on discovery criteria specified by the requesting AC.

Subscribe to AC association(s)—The EEC may store the AC association notification criteria and notification address specified in the subscription request. The EEC may monitor and detect when events satisfying the notification criteria have been met such as a transition to a different serving EAS is required to maintain an existing AC association, a new AC association has been established, an existing AC association has been updated, an existing AC association has been terminated. If when conditions of a notification criteria have been met, the EEC may send a notification to the notification addresses.

Invite an AC to join an AC association—The EEC may send invitation request(s) to one or more ACs to invite them to join an AC association with other ACs. The EEC may in turn receive a response(s) back indicating whether the ACs accept or reject the invitation.

Relocate AC association context—The EEC may relocate AC association context information to another edge enabler layer function. For example, another EEC, or an EES, ECS or EAS. This may occur as part of another operation such as an ACR or EEC context relocation operation.

Step 5—The EEC returns a response to the requesting EES/ECS. Based on the type of request operation, the response may include one or more of the information elements defined in Table 7 of the Appendix.

EES ECS Initiated Notification Requests

Figure 10:
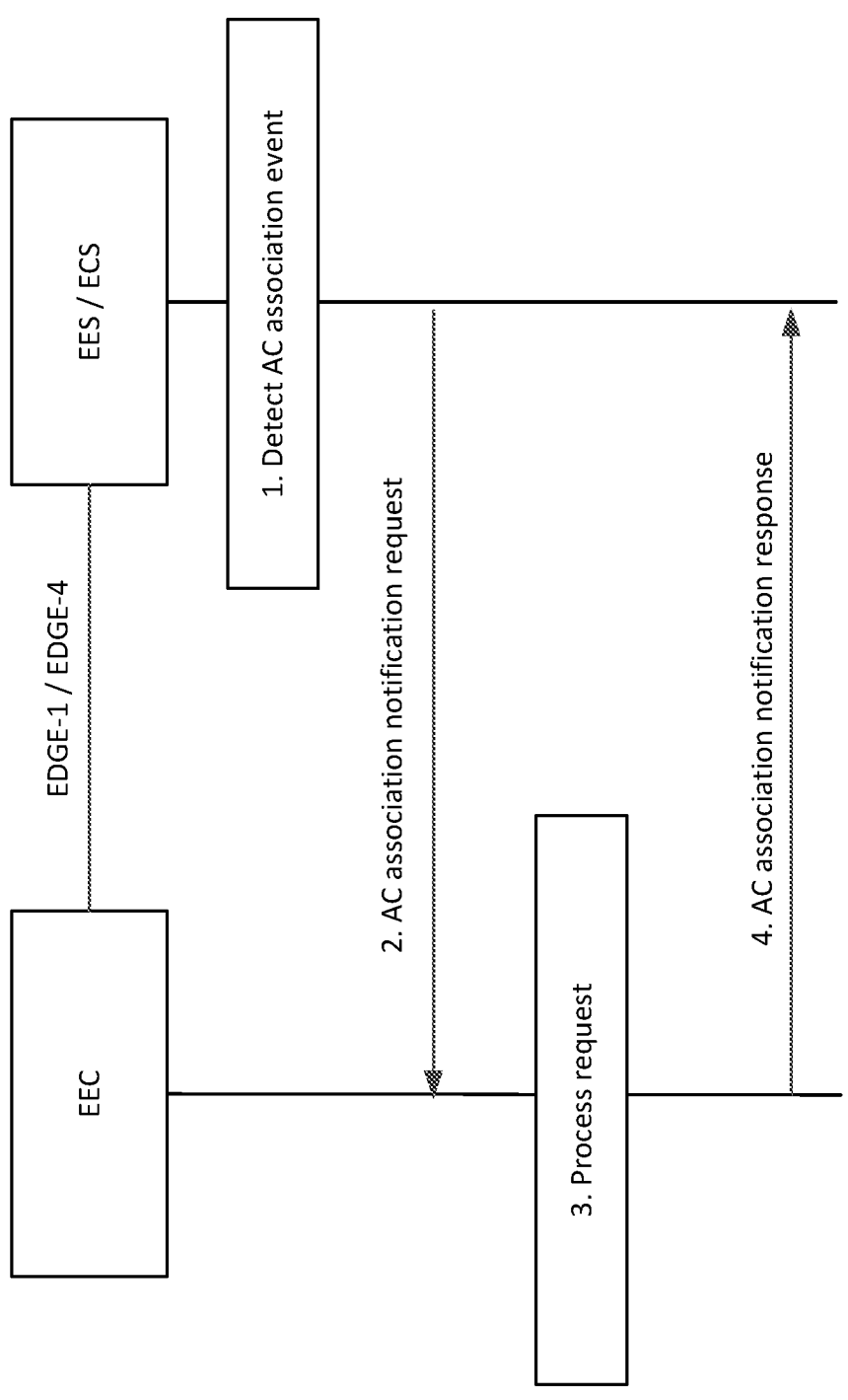
FIG. 10 depicts EES initiated EDGE-1 AC association notifications.

As shown in FIG. 10, an EES may initiate an AC association notification request to an EEC over the EDGE-1 or an ECS may initiate an AC association notification request to an EEC over the EDGE-4 reference point.

Step 1—An EES or ECS detects the occurrence of an AC association event. The EES or ECS may use notification criteria specified in one or more AC association subscriptions to determine event conditions of interest to an EEC. The EES or ECS may then monitor the criteria associated with these events of interest to detect if/when they have been met. Alternatively, an EES or ECS may receive a notification from another entity in the network (e.g., another EES or ECS, EEC, EAS, ECS) signaling an AC association event to the EES or ECS.

Step 2—The EES or ECS sends an AC association notification request to the EEC. This notification may be a separate standalone request as shown in FIG. 10. Alternatively, an AC association notification may be embedded (i.e., piggybacked) within another request that the EES or ECS issues to the EEC (not shown in FIG. 10). The request may include one or more of the information elements defined in Table 8 of the Appendix.

Step 3—The EEC receives the AC association notification request and performs validity checks on the request. The validity checks may include checking that the format and structure of the received notification request comprises only valid information permitted for the particular type of notification request. The validity checks may also include checking whether the EEC is interested in receiving the notification. The validity check may also include checking whether the EEC is able and willing to perform the requested actions specified in the notification. The validity check may also include checking whether an AC association referenced in the request is invalid for the type of request (e.g., an AC association already exists or is in the process of being created which conflicts with this request).

Step 4—If the received AC association notification request is successfully validated, the EEC processes the notification. Based on the type of event specified in the notification request, the EEC may itself perform the operations defined Table 9 of the Appendix. When performing these operations, the EEC may make use of information included within the notification request defined in Table 8 of the Appendix. The EEC may also forward notification request(s) to one or more ACs resident on the UE for the ACs to perform the operations defined in Table 9. In addition, the EEC may also perform additional operations such as one or more of the following:

The EEC may check whether ACs resident on the UE and referenced within the AC association of the notification are still active on the UE and/or are still interested in being a part of the AC association. If not, the EEC may filter the notification for these ACs by not performing notification operations on behalf of these ACs and/or by not forwarding the notification to these ACs.

If the notification indicates that a transition to a different EAS is required to maintain the AC association, the EEC may issue request(s) to discover a different EAS that provides the type of application or service required by the ACs to interact with one another if it is not already specified in the notification, register the EEC to the EES associated with the different EAS if required and de-register the EEC from any existing EESs if required.

The EEC may issue request to a targeted EES specified in the notification or the serving EES to perform ACR to migrate context information from the serving EES and/or EAS to the selected targeted EES and/or EAS, The EEC may inform the AC(s) resident on the UE that the ACR has completed and that they should discontinue using the serving EAS and transition over to using the targeted EAS.

Step 5—The EEC returns a response to the requesting EES or ECS. Based on the type of event and action specified in the notification request, the response may include one or more of the information elements defined in Table 10 of the Appendix.

EDGE-3 E2E-EASC Procedures

Figure 11:
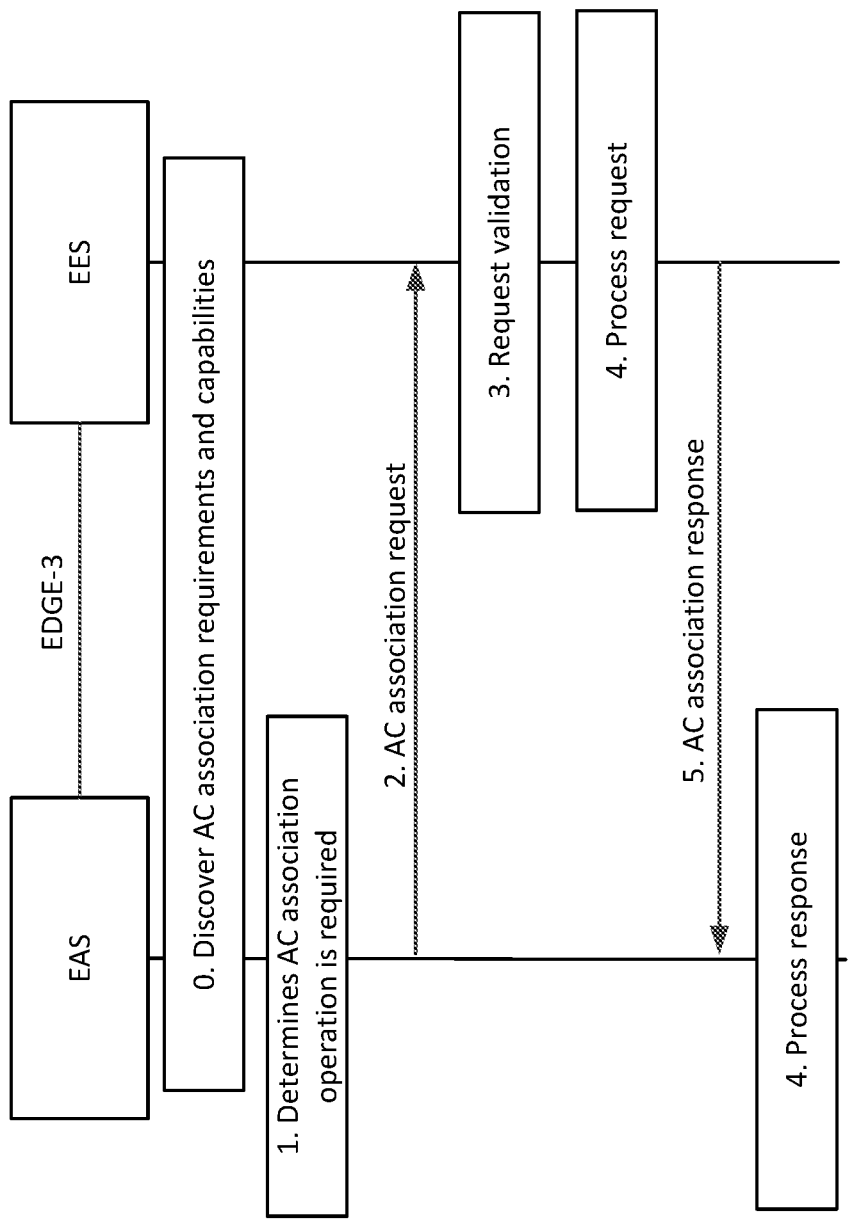
FIG. 11 depicts EAS initiated EDGE-3 AC association request.

An EAS and an EES may interact with one another over the EDGE-3 reference point shown in FIG. 5 to perform the following types of E2E-EASC operations. EAS initiated AC association requests An EAS may initiate AC association requests to an EES over the EDGE-3 reference point as shown in FIG. 11.

Step 0—An EAS and EES may exchange AC association discovery information. This exchange may take place via one or more messages dedicated to the exchange of AC association discovery information. Alternatively, this exchange may be piggybacked within existing request or response messages exchanged between an EAS and EES. For example, a registration, provisioning, discovery, subscription or notification request or response exchanged between an EAS and EES. AC association discovery information may include one or more elements defined in Table 2 of the Appendix. Using this AC association discovery information, an EAS and EES may indicate and/or detect AC association requirements, AC association capabilities, whether AC association functionality is enabled or not, and/or the privileges of edge enabler layer functions to initiate and/or perform AC association operations. Based on this exchange of AC association discovery information, an EAS and EES may determine whether to initiate and/or process subsequent AC association requests.

Step 1—An EAS may determine that a particular type of AC association operation is required for a new or existing AC association such as but not limited to the types of operations defined in Table 4 of the Appendix. The EAS may also determine the identities of one or more ACs applicable to the AC association request. For example, these determinations may be based on input from users interacting with the EAS or one more ACs that interact with the EAS. For example, a user may provide the identity of AC(s) or UE(s) that it would like to establish an association with (e.g., an online gaming session, a remote surgery session, etc.). Alternatively, these determinations may be based on information that the EAS collects based on its interaction with other entities in the system such as one or more ACs, EESs, other EAS(s) or function in an underlying 3GPP core network. This information may include but is not limited to the types of information defined in Table 3 of the Appendix. For example, detecting ACs interacting with one another via services of the EAS.

Step 2—The EAS sends an AC association request to the EES. This request may be a separate standalone request as shown in FIG. 11. Alternatively, an AC association operation may be embedded (i.e., piggybacked) within another request that the EAS issues to the EES (not shown in FIG. 11). The type of request operations that may be performed on an AC association are defined in Table 4 of the Appendix. Based on the type of request operation, the request may include one or more of the information elements defined in Table 5 of the Appendix.

Step 3—The EES receives the request and performs validity checks on the request. The validity checks may include checking that the format and structure of the received request comprises only valid information permitted for the particular type of AC association request. The validity checks may also include checking whether the requesting EAS is authorized to perform the type of AC association request that is received. The validity check may also include checking whether the specified ACs are permitted to be associated with one another. The validity check may also include checking whether an AC association referenced in the request is invalid for the type of request (e.g., an AC association already exists or is in the process of being created which conflicts with this request).

Step 4—If the received request is successfully validated, the EES processes the AC association request. Based on the type of operation specified in the request, the EES performs the following:

Establish AC association(s)—The EES may issue one or more requests to EES(s) and/or ECS(s) in the system to discover ACs matching the requirements of the AC association. The EES or ECS may also share AC association information with other EES(s) and/or ECS(s) by sending AC association requests to these entities. Once the AC association has been established, the EES may trigger and/or perform one or more of the E2E-EASC operations defined in Table 6 of the Appendix. The EES may perform these operations autonomously or by coordinating with other entities in the system (e.g., EESs, EECs, ECSs, EASs, ACs).

Update AC association(s)—The EES may update locally stored AC association information stored for the association with information elements included in the request or determined while processing the request (e.g., selection of a new EAS) such that it may be later factored into edge application service continuity operations. The EES may also share updated AC association information with other EES(s), EEC(s) and/or ECS(s) by sending AC association requests to these entities. Once the AC association has been updated, the EES may trigger and/or perform one or more of the E2E-EASC operations defined in Table 6 of the Appendix. The EES may perform these operations autonomously or by coordinating with other entities in the system (e.g., EESs, EECs, ECSs, EASs, ACs).

Terminate AC association(s)—The EES may remove locally stored AC association information and/or send AC association requests to other EES(s), EEC(s) and/or ECS(s) to remove AC association information from these entities. The EES may determine that a transition of one or more ACs to a different EAS is required to terminate the AC association and in turn initiate one or more ACR operations. The EES may send a notification of the terminated association to one or more EASs and/or applicable ACs.

Discover AC association(s)—The EES may examine locally stored AC association information to determine if any AC associations meet the AC association discovery criteria specified by the requesting EAS. The EES may also issue one or more requests to other EES(s), ECS(s), EAS(s), or EEC(s) in the system to discover existing AS associations based on discovery criteria specified by the requesting EAS.

Subscribe to AC association(s)—The EES may store the AC association notification criteria and notification address specified in the subscription request. The EES may monitor and detect when events satisfying the notification criteria have been met such as a transition to a different serving EAS is required to maintain an existing AC association, a new AC association has been established, an existing AC association has been updated, an existing AC association has been terminated. If when conditions of a notification criteria have been met, the EES may send a notification to the notification addresses.

Invite an AC to join an AC association—The EES may send invitation request(s) to one or more ACs to invite them to join an AC association with other ACs. The EES may in turn receive a response(s) back indicating whether the ACs accept or reject the invitation.

Relocate AC association context—The EES may relocate AC association context information to another edge enabler layer function. For example, another EES, ECS, EEC or EAS. This may occur as part of another operation such as an ACR or EEC context relocation operation.

Step 5—The EES returns a response to the requesting EAS. Based on the type of request operation, the response may include one or more of the information elements defined in Table 7 of the Appendix.

Step 6—The EAS processes the response. Based on the type of AC association request operation and the information contained in the response, the EAS may perform one or more subsequent operations such as but not limited to the following:

The EAS may initiate a request to establish AC association(s) if no AC associations meeting its requirements were discovered The EAS may send AC association invitation requests to one or more ACs The AC may initiate a request to establish an AC association with AC(s) that accepted an AC association invitation The EAS may initiate a request to update discovered AC association(s)

The EAS may initiate a request to terminate discovered AC association(s)

The EAS may start listening for notifications for an AC association subscription that was successfully created The EAS may start servicing requests from the ACs affiliated with an AC association in a manner which complies with the KPIs of the AC association as defined in the AC association context defined in Table 1 of the Appendix.

EES Initiated AC Association Notification Requests

Figure 12:
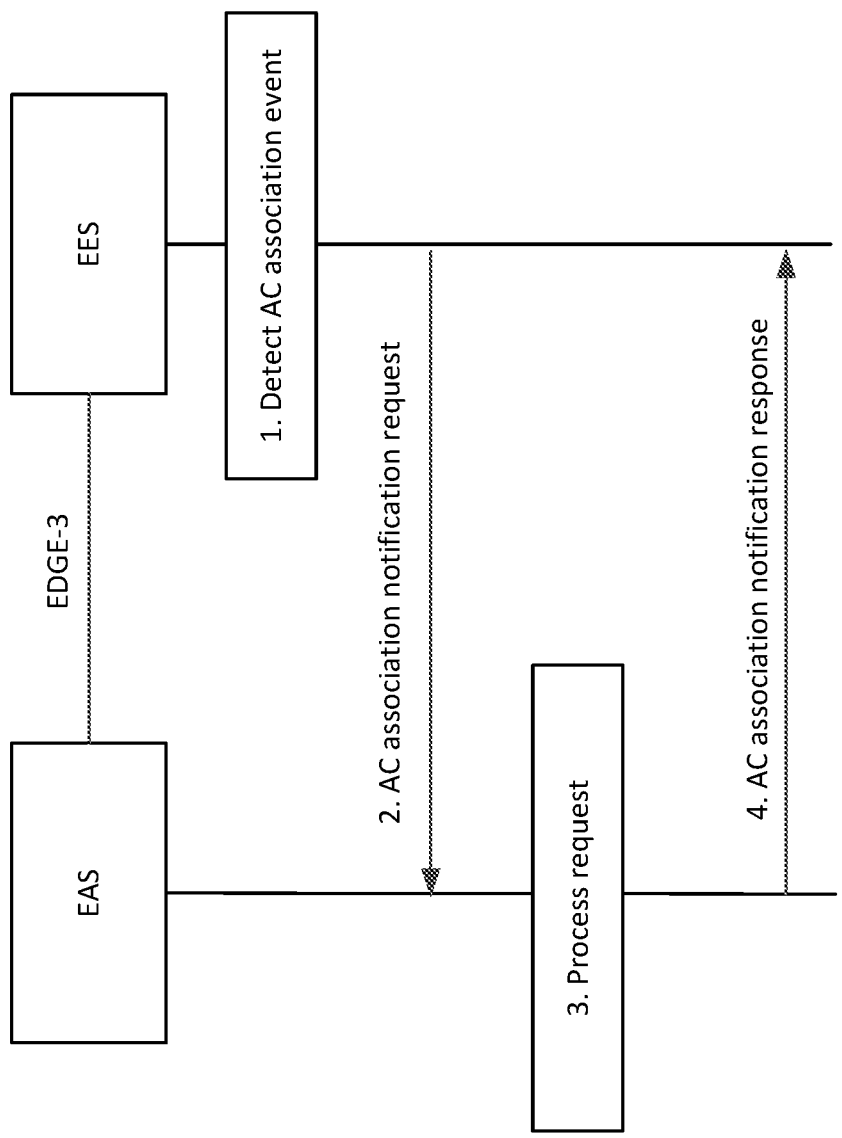
FIG. 12 depicts EES initiated EDGE-3 AC association notifications.

An EES may initiate an AC association notification request to an EAS over the EDGE-3 reference point as shown in FIG. 12.

Step 1—An EES detects the occurrence of an AC association event. The EES may use subscription criteria specified in one or more AC association subscriptions to determine event conditions of interest to an EAS. The EES may then monitor the criteria associated with these events of interest to detect if/when they have been met. Alternatively, an EES may receive a notification from another entity in the network (e.g., other EES, EAS, ECS) signaling an AC association event to the EES.

Step 2—The EES sends an AC association notification request to the EAS. This notification may be a separate standalone request as shown in FIG. 12. Alternatively, an AC association notification may be embedded (i.e., piggy-backed) within another request that the EES issues to the EAS (not shown in FIG. 12). The request may include one or more of the information elements defined in Table 8 of the Appendix.

Step 3—The EAS receives the AC association notification request and performs validity checks on the request. The validity checks may include checking that the format and structure of the received notification request comprises only valid information permitted for the particular type of notification request. The validity checks may also include checking the AC association subscription identifier to determine whether the EAS is interested in receiving notifications associated with this subscription (e.g., it is a subscription that the EAS created and not another EAS). The validity check may also include checking whether the EAS is able and willing to perform the requested actions specified in the notification. The validity check may also include checking whether an AC association referenced in the request is invalid for the type of request (e.g., an AC association already exists or is in the process of being created which conflicts with this request).

Step 4—If the received AC association notification request is successfully validated, the EAS processes the request. Based on the type of event specified in the notification request, the EAS may perform one or more of the operations defined in Table 9 of the Appendix.

Step 5—The EAS returns a response to the requesting EES. Based on the type of event and action specified in the notification request, the response may include one or more of the information elements defined in Table 10 of the Appendix.

EDGE-6 E2E-EASC Procedures

An EES and an ECS may interact with one another over the EDGE-6 reference point shown in FIG. 5 to perform the following types of E2E-EASC operations.

EES Initiated AC Association Requests

Figure 13:
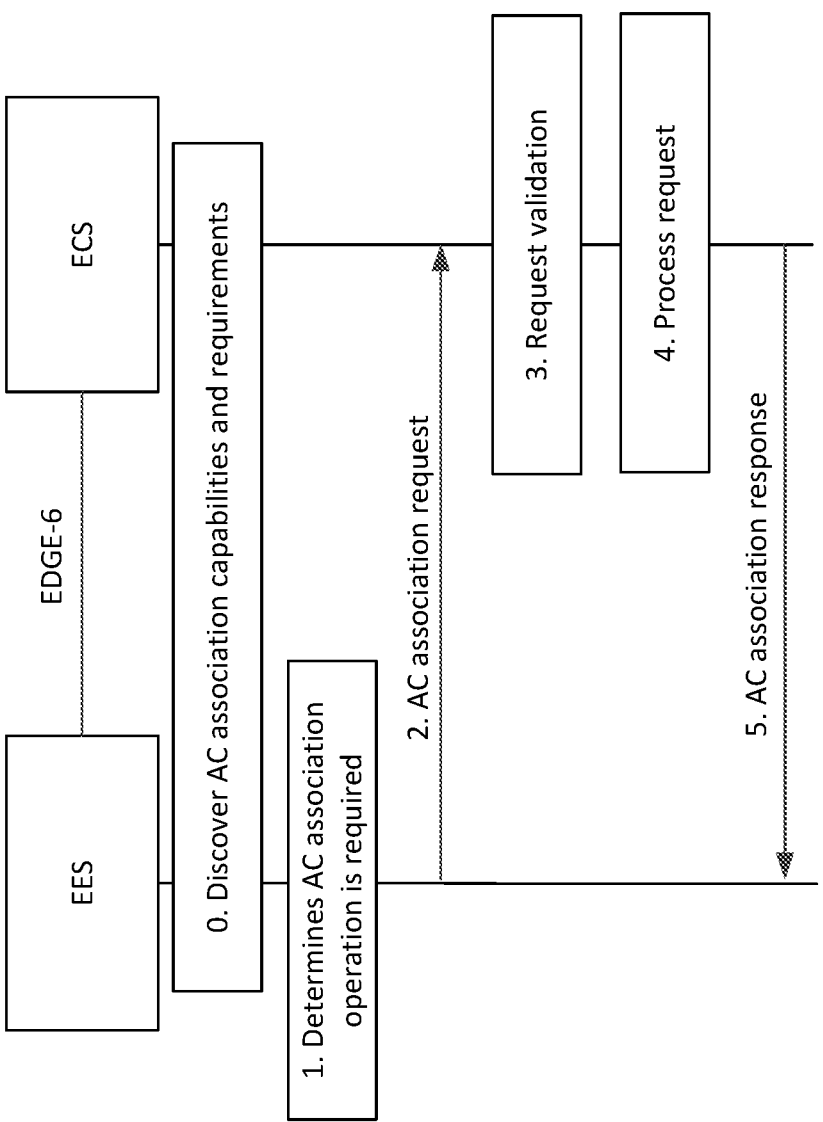
FIG. 13 depicts EES initiated EDGE-6 AC association request.

An EES may initiate AC association requests to an ECS over the EDGE-6 reference point as shown in FIG. 13.

Step 0—An EES and ECS may exchange AC association discovery information. This exchange may take place via one or more messages dedicated to the exchange of AC association discovery information. Alternatively, this exchange may be piggybacked within existing request or response messages exchanged between an EES and ECS. For example, a registration, provisioning, discovery, subscription or notification request or response exchanged between an EES and ECS. AC association discovery information may include one or more elements defined in Table 2 of the Appendix. Using this AC association discovery information, an EES and ECS may indicate and/or detect AC association requirements, AC association capabilities, whether AC association functionality is enabled or not, and/or the privileges of edge enabler layer functions to initiate and/or perform AC association operations. Based on this exchange of AC association discovery information, an EES and ECS may determine whether to initiate and/or process subsequent AC association requests.

Step 1—An EES may determine that a particular type of AC association operation is required for a new or existing AC association such as but not limited to the types of operations defined in Table 4 of the Appendix. The EES may make this determination based on information contained within AC association requests or service continuity requests received from one or more other entities in the network, such as but not limited to an EEC, EAS, another EES or a function in an underlying 3GPP network. An EES may also make this determination based on other means such as analyzing information that it collects from one or more ACs such as but not limited to the information specified in Table 3 of the Appendix and/or the service usage patterns of ACs which it monitors. For example, information regarding which EASs are used by which ACs. For example, information regarding the message exchanges between an ACs enabled via services of an EAS.

Step 2—The EES sends AC association request(s) to an ECS. The request(s) may be sent as a standalone AC association request(s) as shown in FIG. 13. Alternatively, this information may be piggy-backed and carried within another message (not shown in FIG. 13). For example, AC association information may be included in one or more information elements contained within a registration or a service provisioning request that the EES sends to an ECS. In either case, the information included in the dedicated or piggy-backed request may include one or more of the information elements specified in Table 4 and/or Table 5 of the Appendix.

Step 3—The ECS receives the request and performs validity checks on the request. The validity checks may include checking that the format and structure of the received request comprises only valid information permitted for the particular type of AC association request. The validity checks may also include checking whether the requesting EES is authorized to perform the type of AC association request that is received. The validity check may also include checking whether the ACs specified in the received request are permitted to be associated with one another. The validity check may also include checking whether an AC association referenced in the request is invalid for the type of request (e.g., an AC association already exists or is in the process of being created which conflicts with this request).

Step 4—If the received request is successfully validated, the ECS processes the AC association request. Based on the type of operation specified in the request, the ECS may perform one or more of the following actions:

Establish AC association(s)—The ECS may determine EASs matching the requirements of the AC association. The ECS may also share AC association information with other EES(s) and/or other ECS(s) by sending AC association requests to these entities. Once the AC association has been established, the ECS may trigger and/or perform one or more of the E2E-EASC operations defined in Table 6 of the Appendix. The ECS may perform these operations autonomously or by coordinating with other entities in the system (e.g., EESs, EECs, ECSs, EASs, ACs).

Update AC association(s)—The ECS may update locally stored AC association information stored for the association with information elements included in the request or determined while processing the request (e.g., selection of a new EAS) such that it may be later factored into edge application service continuity operations. The ECS may share updated AC association information with EES(s), EEC(s) and/or other ECS(s) by sending AC association requests to these entities. Once the AC association has been updated, the ECS may trigger and/or perform one or more of the E2E-EASC operations defined in Table 6 of the Appendix. The ECS may perform these operations autonomously or by coordinating with other entities in the system (e.g., EESs, EECs, ECSs, EASs, ACs).

Terminate AC association(s)—The ECS may remove locally stored AC association information and/or send AC association requests to other ECS(s) to remove AC association information from these entities. The ECS may determine that a transition of one or more ACs to a different EAS is required to terminate the AC association and in turn initiate one or more ACR operations. The ECS may send a notification of the terminated association to one or more EASs, EEC(s) and/or applicable ACs.

Discover AC association(s)—The ECS may examine locally stored AC association information to determine if any AC associations meet the AC association discovery criteria specified by the requesting AC. The ECS may also issue one or more requests to EES(s), other ECS(s), EAS(s), or EEC(s) in the system to discover existing AC associations based on discovery criteria specified by the requesting AC.

Subscribe to AC association(s)—The ECS may store the AC association notification criteria and notification address specified in the subscription request. The ECS may monitor and detect when events satisfying the notification criteria have been met such as a transition to a different serving EAS is required to maintain an existing AC association, a new AC association has been established, an existing AC association has been updated, an existing AC association has been terminated. If when conditions of a notification criteria have been met, the ECS may send a notification to the notification addresses.

Invite an AC to join an AC association—The ECS may send invitation request(s) to one or more EECs/ACs to invite them to join an AC association with other ACs. The ECS may in turn receive a response(s) back indicating whether the ACs accept or reject the invitation.

Relocate AC association context—The ECS may relocate AC association context information to another edge enabler layer function. For example, another ECS, EES, EEC or EAS. This may occur as part of another operation such as an ACR or EEC context relocation operation.

Step 5—The ECS returns a response to the requesting EES. Based on the type of request operation, the response may include one or more of the information elements defined in Table 7 of the Appendix.

ECS Initiated AC Association Notification Requests

Figure 14:
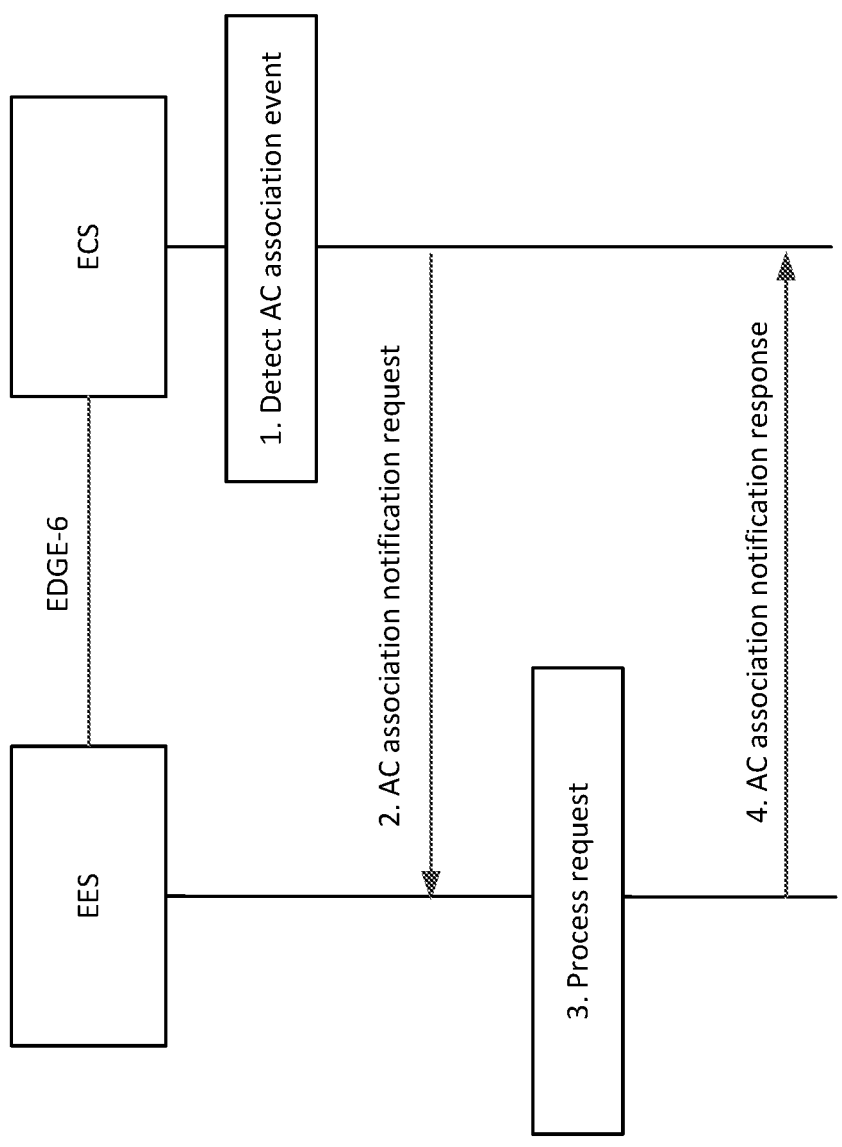
FIG. 14 depicts ECS initiated EDGE-6 AC association notifications.

FIG. 14 illustrates example ECS initiated EDGE-6 AC association notifications. As shown in FIG. 14, an ECS may initiate an AC association notification request to an EES over the EDGE-6 reference point.

Step 1—An ECS detects the occurrence of an AC association event. The ECS may use notification criteria specified in one or more AC association subscriptions to determine event conditions of interest to an EES. The ECS may then monitor the criteria associated with these events of interest to detect if/when they have been met. Alternatively, an ECS may receive a notification from another entity in the network (e.g., other EES, other ECS, EEC, EAS) signaling an AC association event to the ECS.

Step 2—The ECS sends an AC association notification request to the EES. This notification may be a separate standalone request as shown in FIG. 14. Alternatively, an AC association operation may be embedded (i.e., piggybacked) within another request that the ECS issues to the AC (not shown in FIG. 14). The request may include one or more of the information elements defined in Table 8 of the Appendix.

Step 3—The EES receives the AC association notification request and performs validity checks on the request. The validity checks may include checking that the format and structure of the received notification request comprises only valid information permitted for the particular type of notification request. The validity checks may also include checking whether the EES is interested in receiving the notification. The validity check may also include checking whether the EES is able and willing to perform the requested actions specified in the notification. The validity check may also include checking whether an AC association referenced in the request is invalid for the type of request (e.g., an AC association already exists or is in the process of being created which conflicts with this request).

Step 4—If the received AC association notification request is successfully validated, the EES processes the notification. Based on the type of event specified in the notification request, the EES may perform the following operations defined Table 9 of the Appendix. When performing these operations, the EEC may make use of information included within the notification request defined in Table 8 of the Appendix. The EEC may also forward notification request(s) to one or more ACs resident on the UE for the ACs to perform the operations defined in Table 9.

Step 5—The EES returns a response to the requesting ECS. Based on the type of event and action specified in the notification request, the response may include one or more of the information elements defined in Table 10 of the Appendix.

EDGE-9 E2E-EASC Procedures

EESs may interact with one another over the EDGE-9 reference point shown in FIG. 5 to perform the following types of E2E-EASC operations.

S-EES Initiated AC Association Requests

Figure 15:
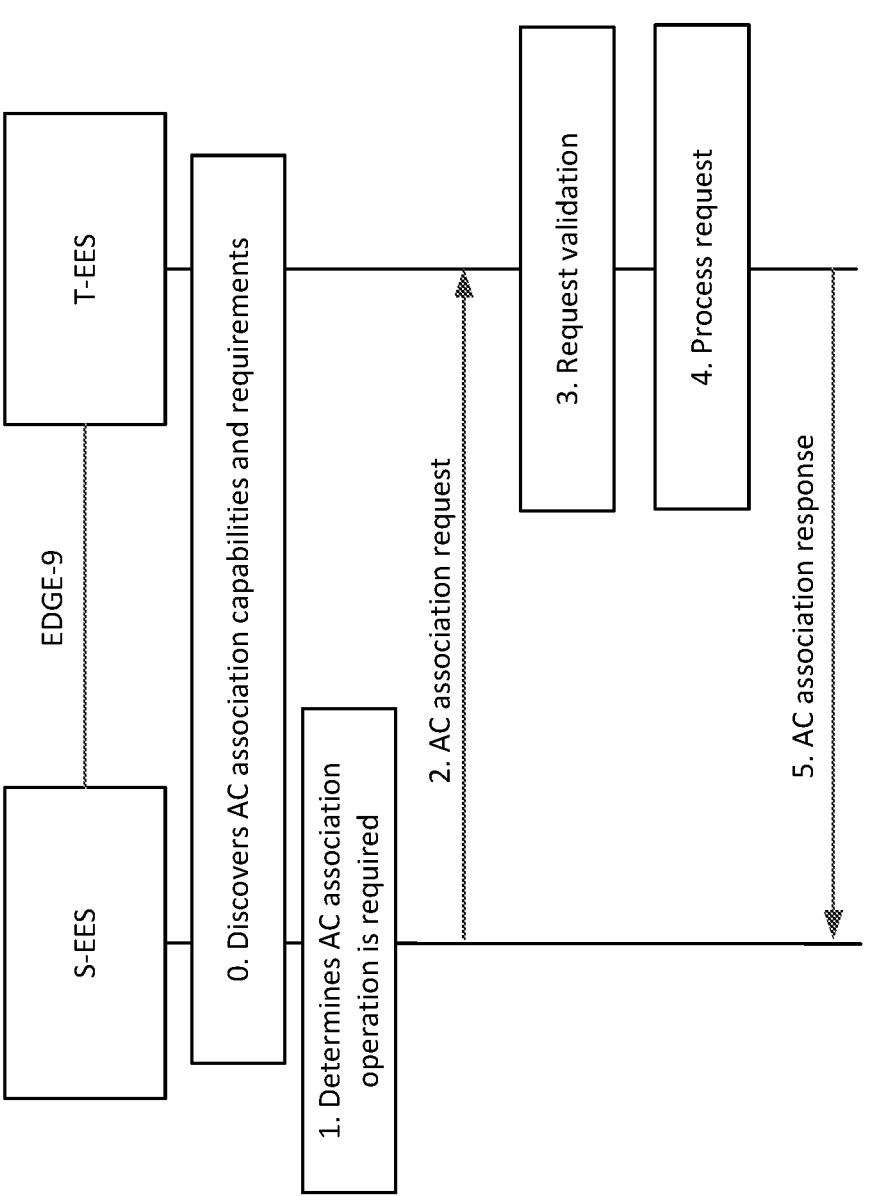
FIG. 15 depicts S-EES initiated EDGE-9 AC association request.

FIG. 15 illustrates an example S-EES initiated EDGE-9 AC association request. A serving EES (S-EES) may initiate AC association requests to a targeted EES (T-EES) over the EDGE-9 reference point as shown in FIG. 15. For example, to create, update transfer an AC association from the S-EES to a T-EES to manage.

Step 0—An S-EES and T-EES may exchange AC association discovery information. This exchange may take place via one or more messages dedicated to the exchange of AC association discovery information. Alternatively, this exchange may be piggy-backed within existing request or response messages exchanged between an S-EES and T-EES. For example, a registration, provisioning, discovery, subscription or notification request or response exchanged between an S-EES and T-EES. AC association discovery information may include one or more elements defined in Table 2 of the Appendix. Using this AC association discovery information, an S-EES and T-EES may indicate and/or detect AC association requirements, AC association capabilities, whether AC association functionality is enabled or not, and/or the privileges of edge enabler layer functions to initiate and/or perform AC association operations. Based on this exchange of AC association discovery information, an S-EES and T-EES may determine whether to initiate and/or process subsequent AC association requests.

Step 1—A S-EES may determine that a particular type of AC association operation is required for a new or existing AC association such as but not limited to the types of operations defined in Table 4 of the Appendix. The S-EES may make this determination based on information contained within AC association requests or service continuity requests received from one or more other entities in the network, such as but not limited to ACs an EEC, EAS, another EES or a function in an underlying 3GPP network. The S-EES may also make this determination based on other means such as analyzing information that it collects from one or more ACs such as but not limited to the information specified in Table 3 of the Appendix and/or the service usage patterns of ACs which it monitors. For example, information regarding which EASs are used by which ACs.

Step 2—The S-EES sends AC association request(s) to a T-EES. The request(s) may be sent as standalone AC asso- <body>

 ciation request(s) as shown in FIG. 15. Alternatively, this information may be piggy-backed and carried within another message (not shown in FIG. 15). For example, AC association information may be included in one or more information elements contained within an ACR request that the S-EES sends to a T-EES. In either case, the information included in the dedicated or piggy-backed request may include one or more of the information elements specified in Table 4 and/or Table 5 of the Appendix.

Step 3—The T-EES receives the request and performs validity checks on the request. The validity checks may include checking that the format and structure of the received request comprises only valid information permitted for the particular type of AC association request. The validity checks may also include checking whether the requesting S-EES is authorized to perform the type of AC association request that is received. The validity check may also include checking whether the ACs specified in the received request are permitted to be associated with one another. The validity check may also include checking whether an AC association referenced in the request is invalid for the type of request (e.g., an AC association already exists or is in the process of being created which conflicts with this request).

Step 4—If the received request is successfully validated, the T-EES processes the AC association request. Based on the type of operation specified in the request, the T-EES may perform one or more of the following actions:

Establish AC association(s)—The T-EES may determine EASs matching the requirements of the AC association. The T-EES may also share AC association information with other EES(s), EAS(s), EEC(s) and/or ECS(s) by sending AC association requests to these entities. Once the AC association has been established, the T-EES may trigger and/or perform one or more of the E2E-EASC operations defined in Table 6 of the Appendix. The T-EES may perform these operations autonomously or by coordinating with other entities in the system (e.g., EESs, EECs, ECSs, EASs, ACs).

Update AC association(s)—The T-EES may update locally stored AC association information stored for the association with information elements included in the request or determined while processing the request (e.g., selection of a new EAS) such that it may be later factored into edge application service continuity operations. The T-EES may share updated AC association information with other EES(s), EAS(s), EEC(s) and/or other ECS(s) by sending AC association requests to these entities. Once the AC association has been updated, the T-EES may trigger and/or perform one or more of the E2E-EASC operations defined in Table 6 of the Appendix. The T-EES may perform these operations autonomously or by coordinating with other entities in the system (e.g., EESs, EECs, ECSs, EASs, ACs).

Terminate AC association(s)—The T-EES may remove locally stored AC association information and/or send AC association requests to EAS(s), EEC(s) or ECS(s) to remove AC association information from these entities. The T-EES may determine that a transition of one or more ACs to a different EAS is required to terminate the AC association and in turn initiate one or more ACR operations. The T-EES may send a notification of the terminated association to one or more EASs and/or applicable ACs.

Discover AC association(s)—The T-EES may examine locally stored AC association information to determine if any AC associations meet the AC association discovery criteria specified by the requesting AC. The T-EES may also issue one or more requests to EES(s), ECS(s), EAS(s), or EEC(s) in the system to discover existing AC associations based on discovery criteria specified.

Subscribe to AC association(s)—The T-EES may store the AC association notification criteria and notification address specified in the subscription request. The T-EES may monitor and detect when events satisfying the notification criteria have been met such as a transition to a different serving EAS is required to maintain an existing AC association, a new AC association has been established, an existing AC association has been updated, an existing AC association has been terminated. If when conditions of a notification criteria have been met, the T-EES may send a notification to the notification addresses.

Invite an AC to join an AC association—The T-EES may send invitation request(s) to one or more ACs to invite them to join an AC association with other ACs. The T-EES may in turn receive a response(s) back indicating whether the ACs accept or reject the invitation.

Relocate AC association context—The T-EES may relocate AC association context information. For example, pull AC association context from the S-EES to the T-EES. This may occur as part of another operation such as an ACR or EEC context relocation operation.

Step 5—The T-EES returns a response to the requesting S-EES. Based on the type of request operation, the response may include one or more of the information elements defined in Table 7 of the Appendix.

T-EES Initiated AC Association Requests

Figure 16:
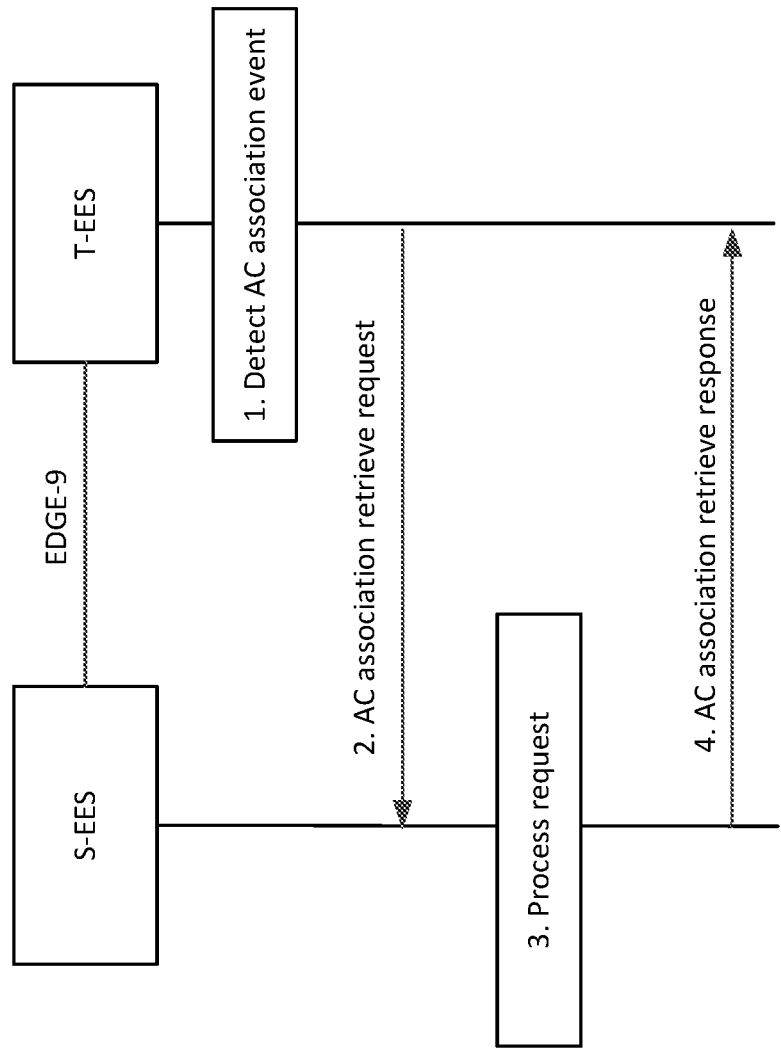
FIG. 16 depicts ECS initiated EDGE-6 AC association notifications.

FIG. 16 illustrates example ECS initiated EDGE-6 AC association notifications. As shown in FIG. 16, a T-EES may initiate an AC association retrieve request to an S-EES over the EDGE-9 reference point.

Step 1—A T-EES detects the occurrence of an AC association event. An ECS may receive a message from another entity in the network (e.g., S-EES, ECS, EEC, EAS) signaling an AC association event to the T-EES.

Step 2—The T-EES sends an AC association retrieve request to the S-EES. The request may include one or more of the information elements defined in Table 8 of the Appendix.

Step 3—The S-EES receives the AC association retrieve request and performs validity checks on the request. The validity checks may include checking that the format and structure of the received notification request comprises only valid information permitted for the request. The validity check may also include checking whether the T-ESS is permitted to perform the AC association retrieve request and if S-EES is able and willing to perform the retrieve request. The validity check may also include checking whether an AC association referenced in the request is invalid for the type of request (e.g., an AC association already exists or is in the process of being created which conflicts with this request).

Step 4—If the received AC association retrieve request is successfully validated, the EES processes the request by returning AC association information to the T-EES. This AC association information may comprise but is not limited to the information defined Table 1 of the Appendix.

AC Association Aware Procedures

Once AC Associations have been established edge enabler layer functions may take into consideration AC association aware context information when performing other operations such as but not limited to the operations defined in the following sub-clauses.
</body>

AC Association Aware ECS Discovery and Service Provisioning

When an ECS processes a service provisioning request that it receives from an EEC, the ECS may take into consideration AC association context information to determine EES(s) that can provide services to the ACs defined in the AC associations via a common EAS. This AC association context information may be included in the service provisioning request, or the ECS may have access to this information by other means (e.g., from ECS or EAS). The ECS can filter and return only EESs that have registered EASs which meet the AC Association requirements. Similarly, if an ECS receives a service provisioning subscription from an EEC, the ECS may take into AC association context information to determine EES(s) that can provide services to the ACs defined in the AC associations via a common EAS. The ECS may also consider AC association context information when monitoring and detecting events that will result in service provisioning notifications. For example, detecting if/when any of the ACs of an AC association move out of range of an EAS and require a switch to a new EAS. In this case, the ECS can make sure to send notifications to all EECs residing on UEs that host ACs belonging to the same AC association. In doing this, the ECS can ensure that all the EECs are provisioned with information regarding a common EES and EAS.

AC Association Aware EEC Registration

When an EES processes a registration request that it receives from an EEC, the EES may take into consideration AC association context information to determine EAS(s) that can provide services to the ACs defined in the AC associations via a common EAS. This AC association context information may be included in the registration request, or the EES may have access to this information by other means. The EES can filter and return only EASs which meet the AC Association requirements. Similarly, if an EES receives a subscription from an EEC, the EES may consider AC association context information when monitoring and detecting events that will result in notifications to the EEC. For example, detecting if/when any of the ACs of an AC association move out of range of an EAS and require a switch to a new EAS. In this case, the EES can make sure to send notifications to all EECs residing on UEs that host ACs belonging to the same AC association. In doing this, the EES can ensure that all the EECs are provisioned with information regarding a common EAS.

AC Association Aware EAS Registration

When an EES processes a registration request that it receives from an EAS, the EES may take into consideration AC association context information it receives from the EAS. This AC association context information may be stored by the EES and used to process other requests it receives from other edge enabler layer functions. For example, the EES may use AC association context information from an EAS when processing EEC registration requests or EAS discovery requests. For example, the EES may use this information to identify EASs having existing AC associations that other ACs want to join.

AC Association Aware EES Registration

When an ECS processes a registration request that it receives from an EES, the ECS may take into consideration AC association context information it receives from the EES. This AC association context information may be stored by the ECS and used to process other requests it receives from other edge enabler layer functions. For example, the ECS may use AC association context information from an EES when processing EEC service provisioning requests.

For example, the ECS may use this information to identify EESs and/or EASs having existing AC associations that other ACs want to join.

AC Association Aware EAS Discovery

When an EES processes a EAS discovery request that it receives from an EEC, the EES may consider AC association context information to determine EAS(s) that can provide services to the ACs defined in the AC associations via a common EAS. This AC association context information may be included in the EAS discovery request, or the EES may have access to this information by other means (e.g., via EEC registration or from EAS). The EES can filter and return only EASs in the discovery response which meet the AC Association requirements. Similarly, if an EES receives a EAS discovery subscription from an EEC, the EES may consider AC association context information when monitoring and detecting events that will result in EAS discovery notifications to the EEC. For example, detecting if/when any of the ACs of an AC association move out of range of an EAS and require a switch to a new EAS. In this case, the EES can make sure to send EAS discovery notifications to all EECs residing on UEs that host ACs belonging to the same AC association. In doing this, the EES can ensure that all the EECs are provisioned with information regarding a common EAS.

AC Association Aware Service Continuity

When an edge enabler layer function (e.g., AC, EES, EAS, EEC, ECS) is functioning as an ACR detection entity and responsible for detecting or predicting the need of an ACR operation, it may take into consideration AC association context information. For example, the edge enabler layer function may monitor the current or expected locations of each individual UE having a resident AC that is affiliated with an AC association. If any of these UEs change their current location or if their location is expected to change and this location will no longer allow the AC resident on this UE to access the common EAS that is being used by the AC association, then the service layer function can detect or predict that an ACR operation is needed.

Likewise, when an edge enabler layer function (e.g., AC, EES, EAS, EEC, ECS) is functioning as an ACR decision-making entity and responsible for deciding that an ACR operation is required, it may also take into consideration AC association context information. For example, which ACs require an ACR can be based on AC association context information. To provide service continuity to all the ACs and allow them to continue to communicate with one another via a common EAS, the decision can be made to perform ACRs on all the ACs affiliated with an AC association.

When an edge enabler layer function (e.g., AC, EES, EAS, EEC, ECS) is functioning as an ACR execution entity and responsible for executing an ACR operation, it may also take into consideration AC association context information. For example, ACR operations for all the ACs affiliated with an AC association can be performed in unison such that all the ACs are transitioned from their serving EAS to a new target EAS in unison in a synchronized fashion such that end-to-end service interruptions are minimized between the ACs.

AC Association Aware EAS Instantiation

An edge enabler layer function (e.g., EES or ECS) may consider AC association context information to when determining whether to dynamically instantiate an EAS. For example, when the edge enabler function becomes aware of an AC association being established or updated, it may trigger the instantiation of an EAS that can serve as a common EAS for the ACs affiliated with the association.

The edge enabler layer function may consider the location of the UEs which the ACs are resident on when deciding the type and location of the EAS to instantiate. Once instantiated, the edge enabler layer function can configure the EAS with information regarding the AC association (e.g., AC association context information).

AC Association Context Relocation

When an edge enabler layer function (e.g., AC, EES, EAS, EEC, ECS) is functioning as an ACR execution entity and responsible for executing an ACR operation, it may relocate and/or share AC association context information from one edge enabler layer function to or with another(s). One of the edge enabler layer functions may be itself which it relocates or shares AC association context information either to or from. Relocating/sharing of AC association context information can enable other edge enabler layer functions to perform AC association aware operations as defined in this invention.

Example GUI Embodiment

Figure 17:
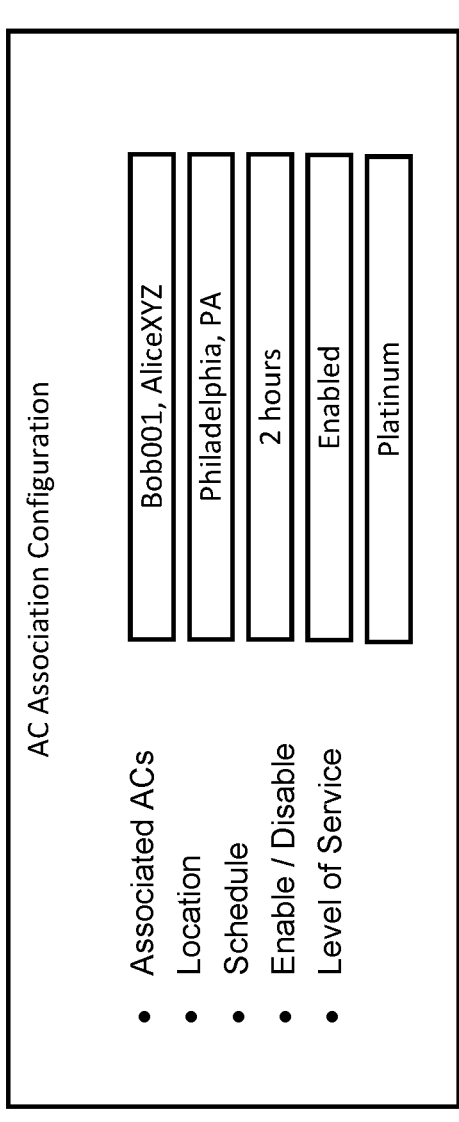
FIG. 17 depicts GUI for managing AC associations.

A user can define an AC association between the AC they are using, and a remote AC being used by another user. For example, in an online gaming use case where a user may setup a remote gaming session with one or more other players. FIG. 17 shows an example GUI to enable a user to configure and manage AC associations.

Example Protocol Embodiment

In one embodiment, end-to-end edge application service continuity (E2E-EASC) messages can be realized as a client/server messaging protocol where edge enabler layer functions can function in the role of a client and/or a server to exchange E2E-EASC centric request and response messages with other one another. For example, the information elements of E2E-EASC centric request and response protocol messages can be encapsulated and carried within the payloads of existing client/server protocols such HTTP, COAP or Web Sockets.

In another embodiment, these information elements can be encapsulated and carried within lower-level protocols such as TCP or UDP without the use of higher layer protocols such as HTTP, COAP or Web Sockets.

In yet another embodiment, the E2E-EASC centric messages can be encapsulated and carried within publish/subscribe messaging protocols. For example, an entity in the System (e.g., one or more of the edge enabler layer functions) can support message broker functionality. This broker functionality can be used by edge enabler layer functions to exchange E2E-EASC centric messages with one another. This exchange can be facilitated by each function subscribing to the message broker to receive messages from other functions. Likewise, each function can publish messages to the message broker that target other functions. The information elements of the E2E-EASC centric request and response protocol messages can be encapsulated and carried within the payloads of existing publish/subscribe protocols such MQTT or AMQP.

In yet another embodiment, E2E-EASC centric information elements may be embedded within 3GPP NAS protocols.

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G." 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 18A:
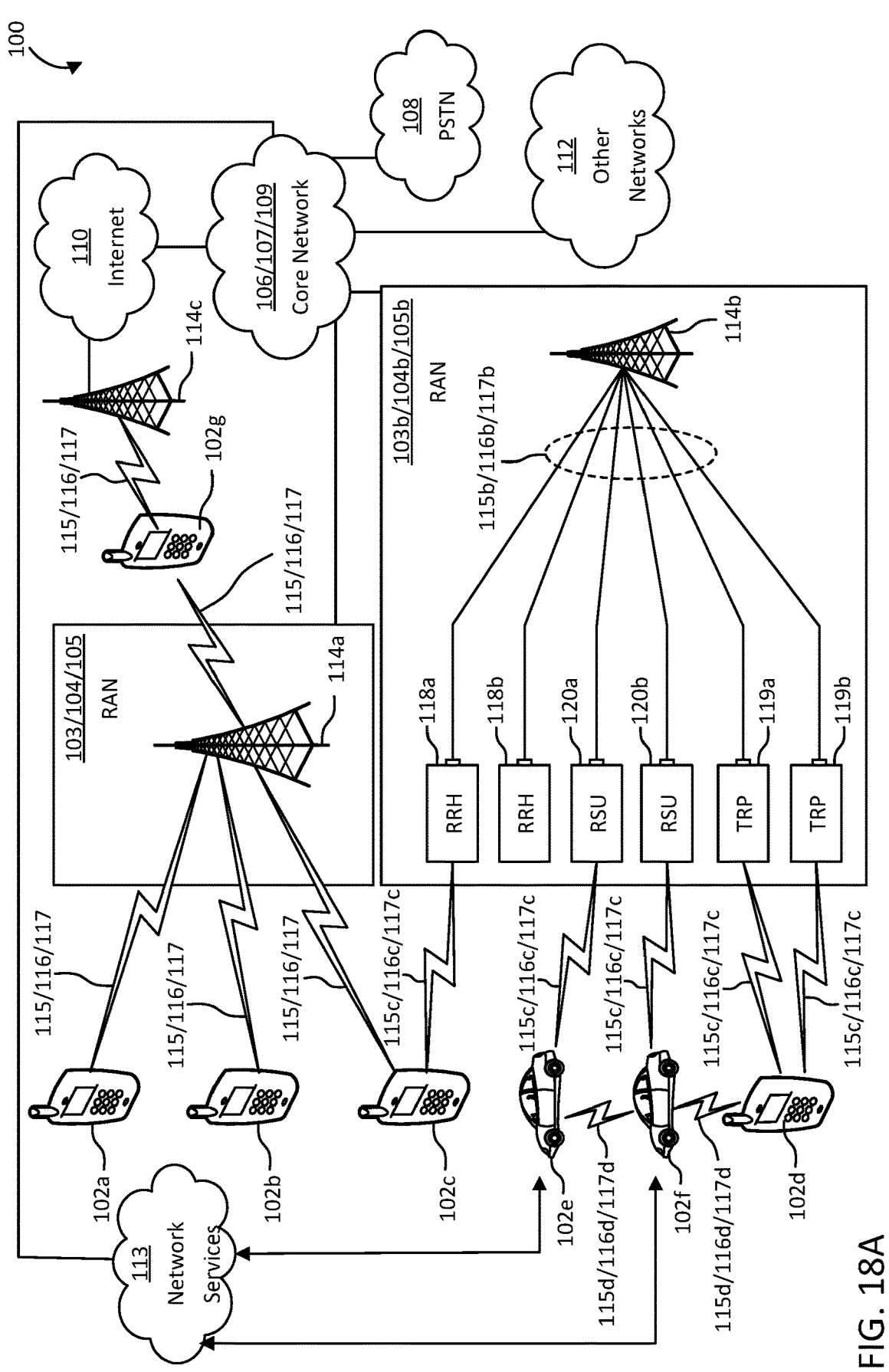
FIG. 18A depicts an example communications system.

FIG. 18A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 18A, each of the WTRUs 102 is depicted in FIGS. 18A-E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114*a* and a base station 114*b*. In the example of FIG. 18A, each base stations 114*a* and 114*b* is depicted as a single element. In practice, the base stations 114*a* and 114*b* may include any number of interconnected base stations and/or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, and/or the other networks 112. Similarly, base station 114*b* may be any type of device configured to wiredly and/or wirelessly interface with at least one of the Remote Radio Heads (RRHs) 118*a*, 118*b*, Transmission and Reception Points (TRPs) 119*a*, 119*b*, and/or Roadside Units (RSUs) 120*a* and 120*b* to facilitate access to one or more communication networks, such as the core network 106/107/109, the Internet 110, other networks 112, and/or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, and/or other networks 112.

TRPs 119*a*, 119*b* may be any type of device configured to wirelessly interface with at least one of the WTRU 102*d*, to facilitate access to one or more communication networks, such as the core network 106/107/109, the Internet 110, Network Services 113, and/or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, and/or Network Services 113. By way of example, the base stations 114*a*, 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114*a* may be part of the RAN 103/104/105, which may also include other base stations and/or network elements (not shown), such as a Base Station Controller (BSC), a Radio Network Controller (RNC), relay nodes, etc. Similarly, the base station 114*b* may be part of the RAN 103*b*/104*b*/105*b*, which may also include other base stations and/or network elements (not shown), such as a BSC, a RNC, relay nodes, etc. The base station 114*a* may be configured to transmit and/or receive wireless signals within a particular geographic region, which may be referred to as a cell (not shown). Similarly, the base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, for example, the base station 114*a* may include three transceivers, e.g., one for each sector of the cell. The base station 114*a* may employ Multiple-Input Multiple Output (MIMO) technology and, therefore, may utilize multiple transceivers for each sector of the cell, for instance.

The base station 114*a* may communicate with one or more of the WTRUs 102*a*, 102*b*, 102*c*, and 102*g* over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114*b* may communicate with one or more of the RRHs 118*a* and 118*b*, TRPs 119*a* and 119*b*, and/or RSUs 120*a* and 120*b*, over a wired or air interface 115*b*/116*b*/117*b*, which may be any suitable wired (e.g., cable, optical fiber, etc.) or wireless communication link (e.g., RF, microwave, IR, UV, visible light, cmWave, mmWave, etc.). The air interface 115*b*/116*b*/117*b* may be established using any suitable RAT.

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., RF, microwave, IR, ultraviolet UV, visible light, cmWave, mmWave, etc.) The air interface 115*c*/116*c*/117*c* may be established using any suitable RAT.

The WTRUs 102 may communicate with one another over a direct air interface 115*d*/116*d*/117*d*, such as Sidelink communication which may be any suitable wireless communication link (e.g., RF, microwave, IR, ultraviolet UV, visible light, cmWave, mmWave, etc.) The air interface 115*d*/116*d*/117*d* may be established using any suitable RAT.

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*,TRPs 119*a*, 119*b* and/or RSUs 120*a* and 120*b* in the RAN 103*b*/104*b*/105*b* and the WTRUs 102*c*, 102*d*, 102*e*, and 102*f*, may implement a radio technology such as Universal Mobile Telecommunications System (UMTS) Terrestrial Radio Access (UTRA), which may establish the air interface 115/116/117 and/or 115*c*/116*c*/117*c* respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114*a* in the RAN 103/104/105 and the WTRUs 102*a*, 102*b*, 102*c*, and 102*g*, or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A), for example. The air interface 115/116/117 or 115*c*/116*c*/117*c* may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 18A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 18A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 18A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 18A may be configured to communicate with the base station 114a, which may employ a cellular-based radio technology, and with the base station 114c, which may employ an IEEE 802 radio technology.

Although not shown in FIG. 18A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 18B:
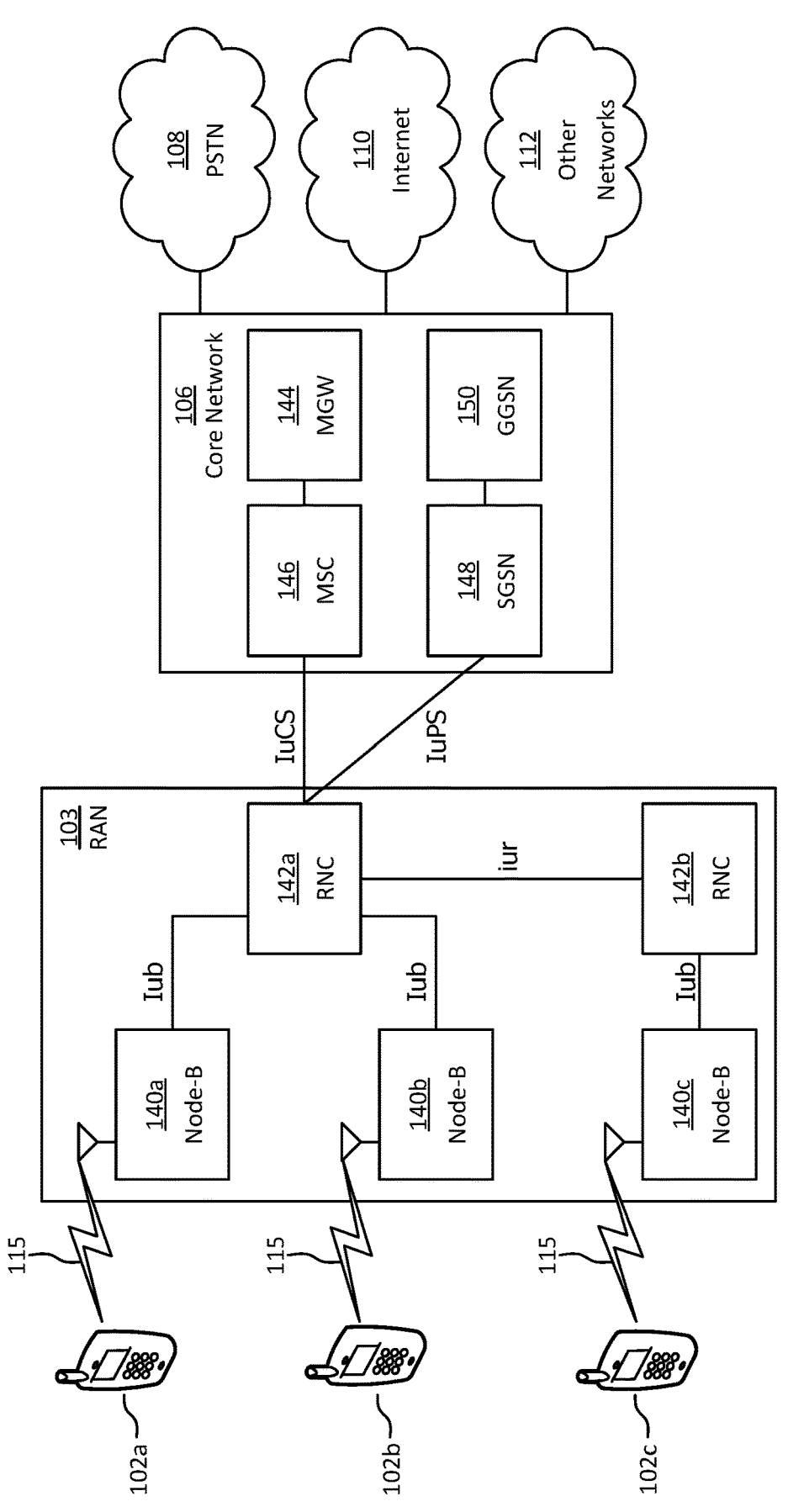
FIGS. 18B-D are system diagrams of example RANs and core networks.

FIG. 18B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 18B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 18B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 18B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 18C:
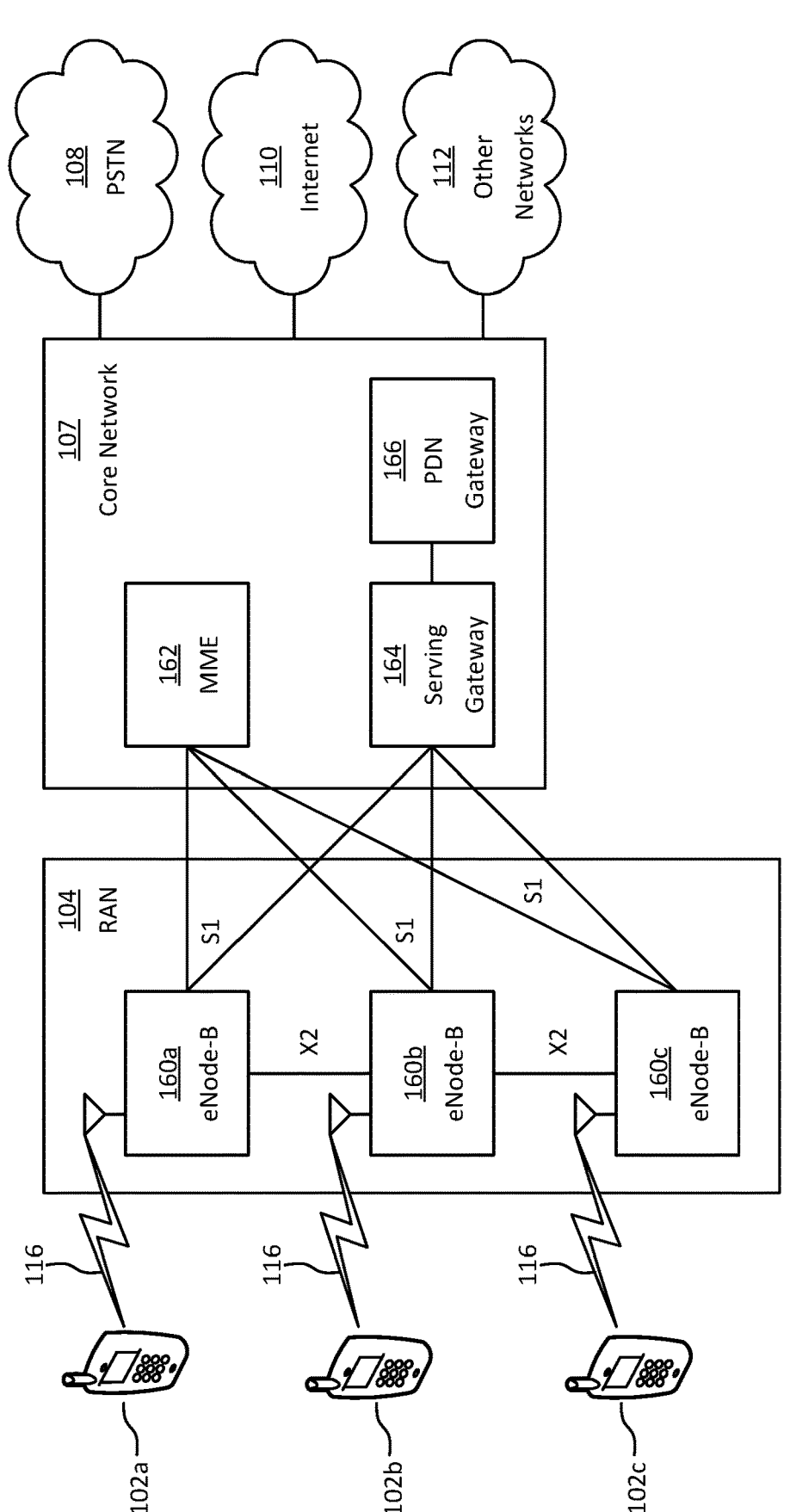

FIG. 18C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 18C, the eNode-Bs 160a, 160b, and 160c may communicate with one another over an X2 interface.

The core network 107 shown in FIG. 18C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 18D:
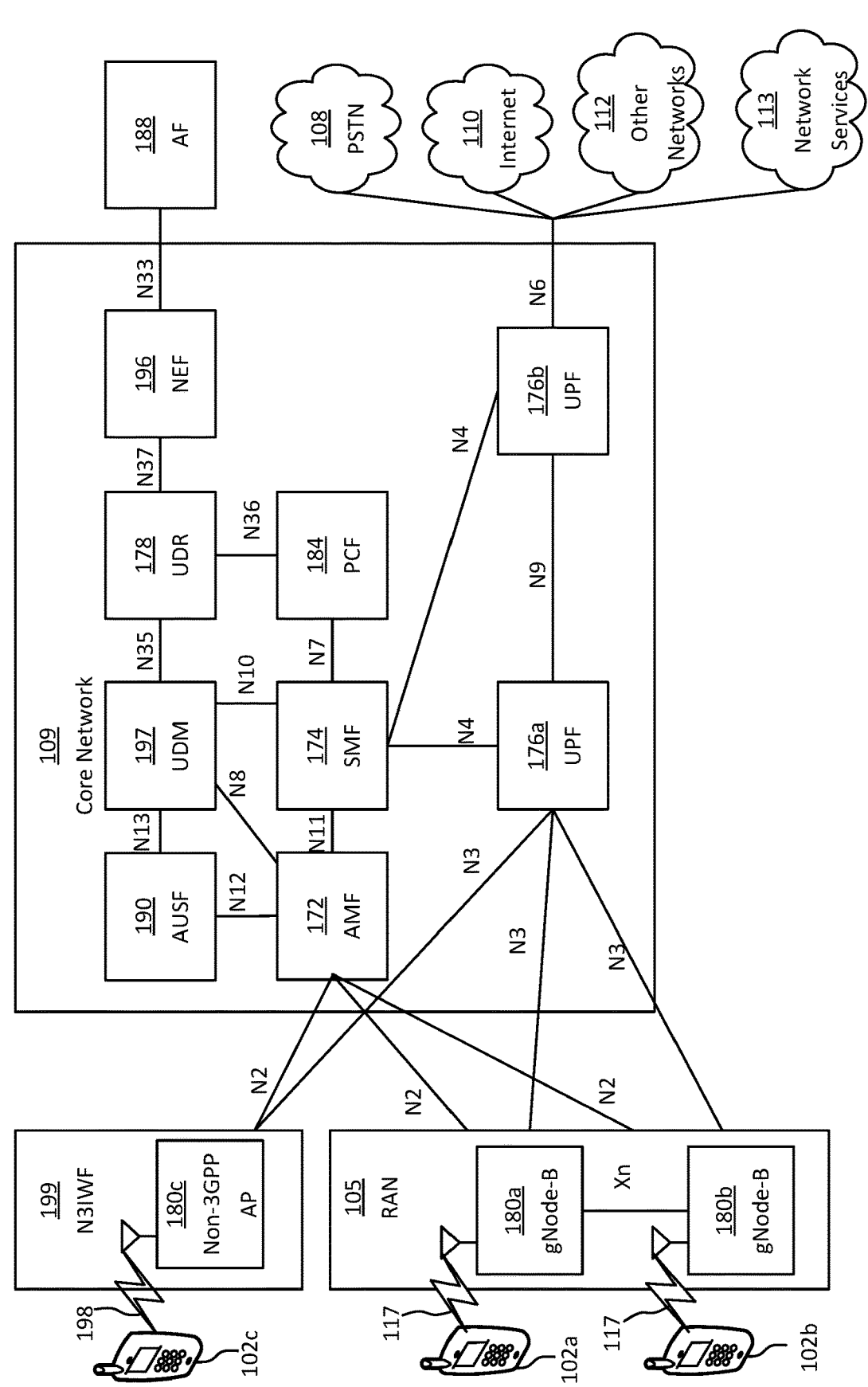

FIG. 18D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 18D, the gNode-Bs 180a and 180b may communicate with one another over an Xn interface, for example.

The core network 109 shown in FIG. 18D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 18G.

In the example of FIG. 18D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 18D shows that network functions directly connect to one another, however, it should be appreciated that they may communicate via routing agents such as a diameter routing agent or message buses.

In the example of FIG. 18D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 18D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 18D. The PCF 184 may provide policy rules to control plane nodes such as the AMF 172 and SMF 174, allowing the control plane nodes to enforce these rules. The PCF 184 may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface, and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance, and isolation.

3GPP has designed the 5G core network to support Network Slicing. Network Slicing is a useful tool that network operators can use to support the diverse set of 5G use cases (e.g., massive IoT, critical communications, V2X, and enhanced mobile broadband) which demand diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 18D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, which serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIG. 18A, FIG. 18C, FIG. 18D, and FIG. 18E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 18A-E are provided by way of example only, and it is understood that the subject matter disclosed and claimed herein may be embodied or implemented in any similar communication system, whether presently defined or defined in the future.

Figure 18E:
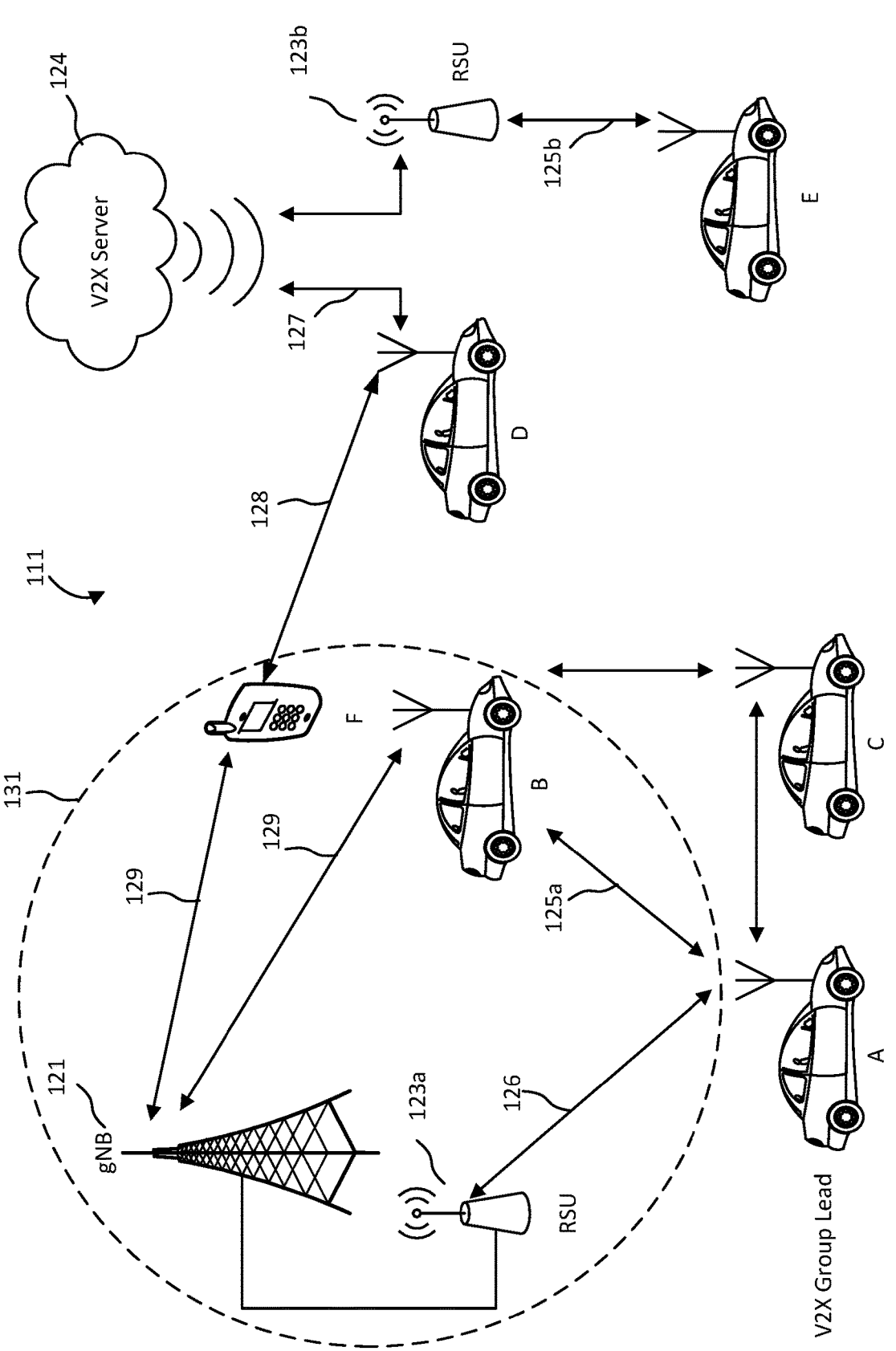
FIG. 18E depicts another example communications system.

FIG. 18E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Roadside Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 18E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 18E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 18F:
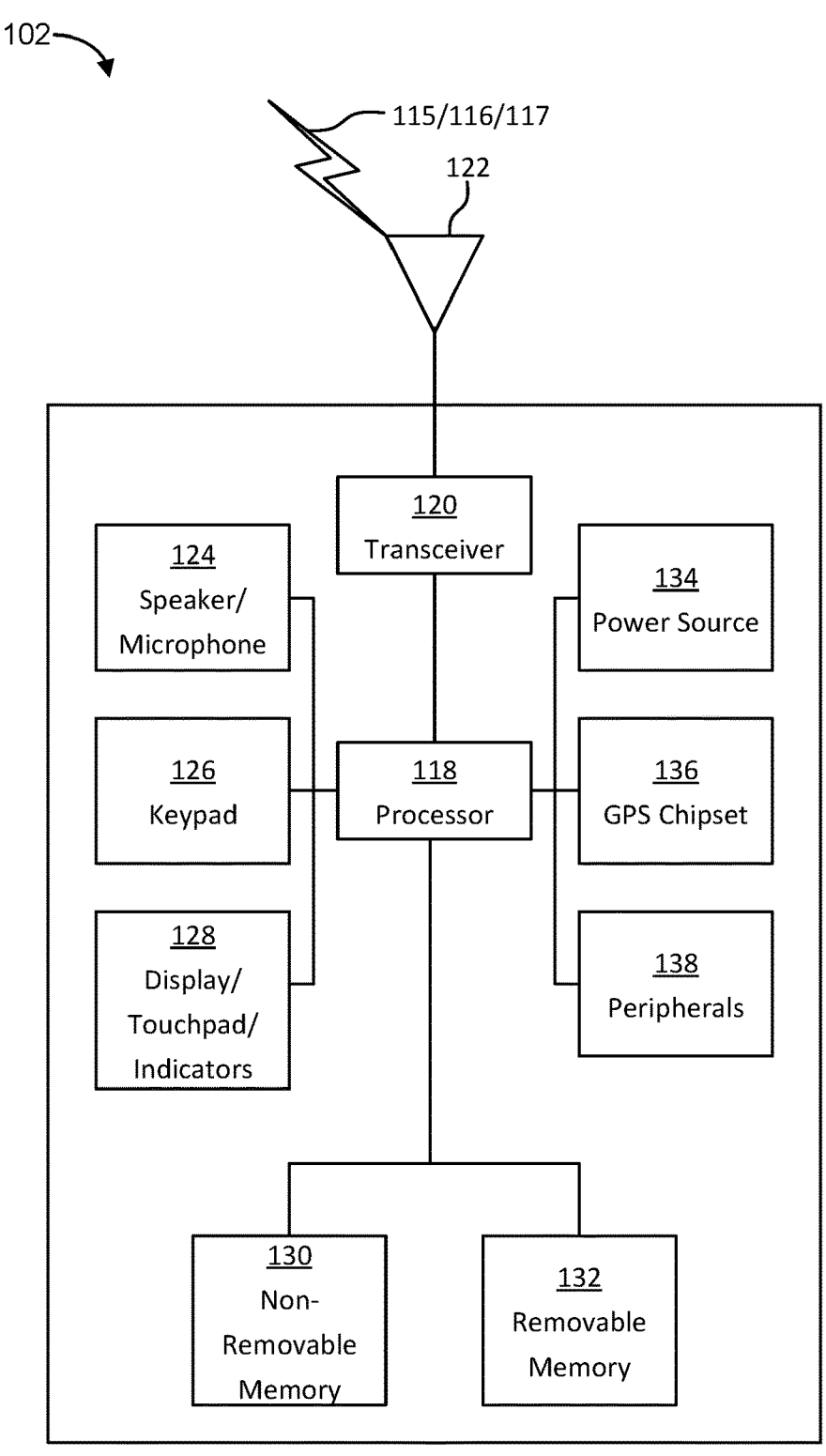
FIG. 18F depicts a block diagram of an example apparatus or device, such as a WTRU.

FIG. 18F is a block diagram of an example apparatus or device WTRU 102 that may be configured for wireless communications and operations in accordance with the systems, methods, and apparatuses described herein, such as a WTRU 102 of FIGS. 18A-E. As shown in FIG. 18F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 18F and described herein.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 18F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 18A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/ receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 18F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/micro-phone 124, the keypad 126, and/or the display/touchpad/ indicators 128 (e.g., a liquid crystal display (LCD) display unit or organic light-emitting diode (OLED) display unit. The processor 118 may also output user data to the speaker/ microphone 124, the keypad 126, and/or the display/touch-pad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location informa-tion (e.g., longitude and latitude) regarding the current location of the WTRU 102. In addition to, or in lieu of, the information from the GPS chipset 136, the WTRU 102 may receive location information over the air interface 115/116/ 117 from a base station (e.g., base stations 114*a*, 114*b*) and/or determine its location based on the timing of the signals being received from two or more nearby base stations. It will be appreciated that the WTRU 102 may acquire location information by way of any suitable loca-tion-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital cam-era (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may com-prise one of the peripherals 138.

Figure 18G:
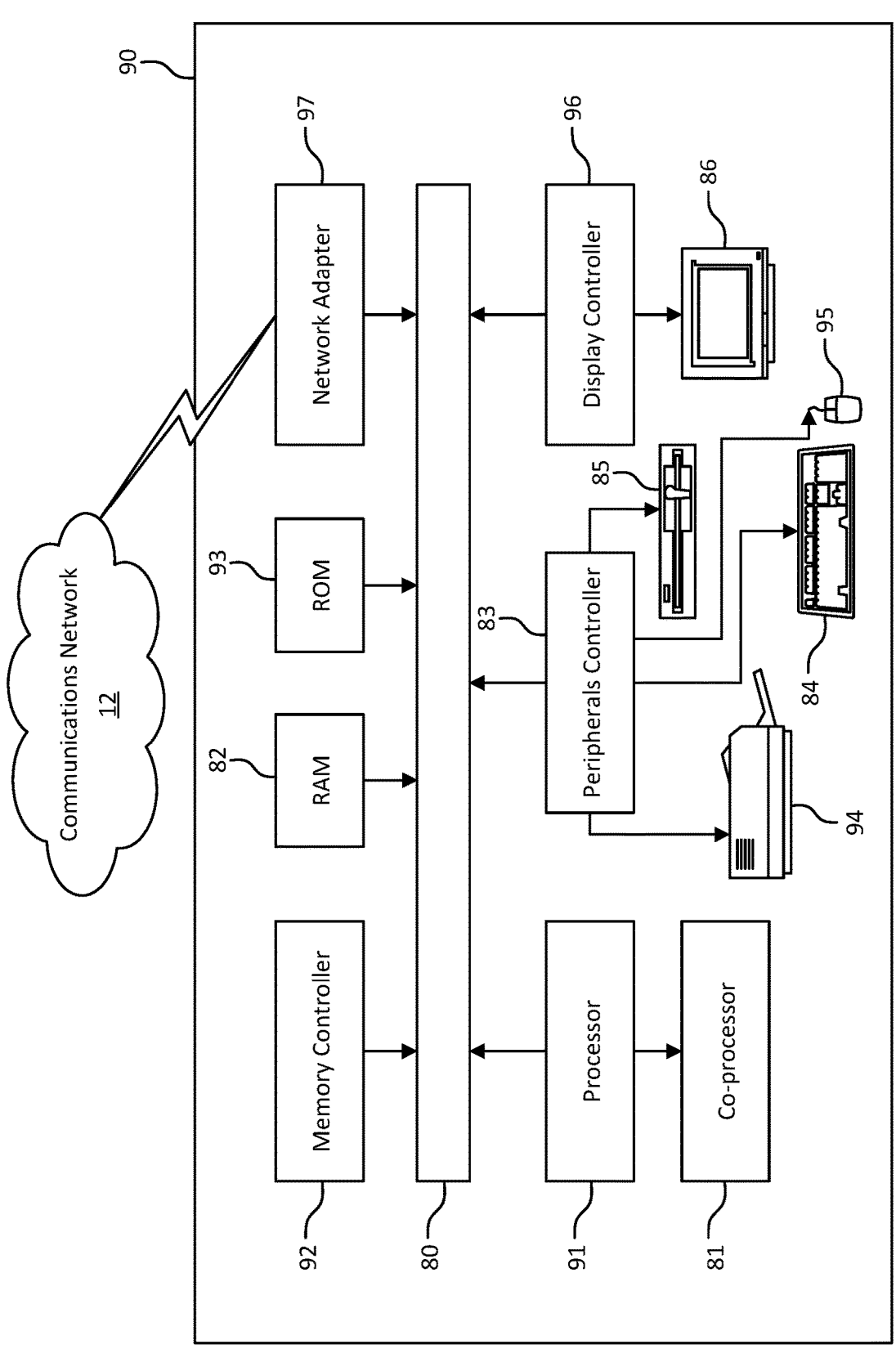
FIG. 18G depicts a block diagram of an exemplary computing system.

FIG. 18G is a block diagram of an exemplary computing system 90 in which one or more apparatuses of the com-munications networks illustrated in FIG. 18A, FIG. 18C, FIG. 18D and FIG. 18E may be embodied, such as certain nodes or functional entities in the RAN 103/104/105, Core Network 106/107/109, PSTN 108, Internet 110, Other Net-works 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general-purpose processor, a special purpose processor, a conventional processor, a digital signal processor (DSP), a plurality of microprocessors, one or more microprocessors in association with a DSP core, a controller, a microcon-troller, Application Specific Integrated Circuits (ASICs), Field Programmable Gate Array (FPGAs) circuits, any other type of integrated circuit (IC), a state machine, and the like. The processor 91 may perform signal coding, data process-ing, power control, input/output processing, and/or any other functionality that enables the computing system 90 to oper-ate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be con-trolled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 18A-1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable, and non-removable media implemented in any non-transitory (e.g., tangible, or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

APPENDIX

TABLE 1

| E2E AC association context | |
| --- | --- |
| Information Elements | Description |
| AC association ID | Used to uniquely identify the end-to-end association between a set of ACs. The ID may comprise information such as but not limited to the following: A unique identifier having uniqueness within a defined scope or region (e.g. within a PLMN domain, globally, etc.) A combination of other IDs (e.g. AC IDs, UE IDs, EEC IDs, EES IDs, EAS IDs) |
| Type of AC association | Identifies the type of association between ACs. The type of association may comprise one or more of the following types: Common/shared EAS based association—ACs require services from the same EAS instance to effectively interact with one another (e.g. for latency purposes) Location based association which may or may not require services from the same EAS UE based association which may or may not require services from the same EAS. Note, the focus of this invention is on the common/shared EAS based association. |
| List of associated ACs | A list of ACs associated with one another and that interact via a shared EAS. Each entry in the list may comprise one or more of the following sub-elements: 3GPP SA6 defined AC Profiles or one or more information elements thereof UE information that the ACs are resident upon. The information may comprise a GPSI, IMSI, or an External identifier of the UE. |
| EAS information | Information regarding the shared EAS used by the associated ACs to interact with one another. The EAS information may comprise one or more of the following elements: A 3GPP SA6 defined EAS Profile or one or more information elements thereof |
| AC Association KPIs | Defines AC association service KPIs that may comprise one or more of the following: The aggregated connection bandwidth to the EAS required by the associated ACs to communicate with one another in an E2E manner |

US 12,568,417 B2

TABLE 1-continued

E2E AC association context

| Information Elements | Description |
|---|---|
| | The aggregated rate of requests to the EAS required by the associated ACs to communicate effectively with one another in an E2E manner |
| | The EAS response time required by the associated ACs to effectively communicate with one another in an E2E manner |
| | The KPIs may be configured by ACs or other edge enabler layer functions such as an EEC or EAS that monitor AC activity and/or are aware of AC service KPIs. |
| AC association service area | Defines the service area for which the AC association is applicable and may comprise one or more of the following elements: |
| | A geo-fenced region in which ACs hosted on UEs located in this region are associated with one another |
| | A PLMN region/domain in which ACs hosted on UEs located in this region/domain are associated with one another |
| | A route for which ACs hosted on UEs traveling along this route are associated with one another |
| AC association schedule | Defines a schedule for which the AC association is valid and/or active and may comprise one or more of the following elements: |
| | relative time durations or windows (e.g., 3 hours) |
| | absolute time durations or windows (e.g., Jan. 1, 2001 00:00:00 GMT-Jan 5., 2001 00:00:00 GMT) |
| UE information | Provides UE information if the association between ACs is based on the UE(s) that the ACs are resident upon. The information may comprise one or more of the following elements: |
| | GPSI, |
| | IMSI, |
| | External identifier |
| AC association control | Used to transition the state of the AC association. The association control element may comprise settings such as but not limited to the following: |
| | Enable—Enable the AC association |
| | Disable—Disable the AC association |
| | If the association control element is set to a value of Enable, the AC association will be considered enabled, and the AC association status element will be set to a value of Enabled. |
| | If the association control element is set to a value of False, the AC association will be considered disabled, and the AC association status element will be set to a value of Disabled. |
| AC association status | Used to reflect the current status of the AC association. The association status element may comprise values such as but not limited to the following: |
| | Enabled—the AC association is enabled |
| | Disabled—the AC association is disabled |
| | If the association status element has a value of Enabled, the AC association is considered enabled by the edge enabler layer functions in the system and the AC association context information will be used when performing operations such as EAS discovery, and ACR service continuity operations. |
| | If the association status element has a value of Disabled, the AC association is considered disabled by the edge enabler layer functions in the system and the AC association context information will not be used when performing operations such as EAS discovery, and ACR service continuity operations. |

TABLE 2

Types of AC association discovery information

| Type of AC association capability information | Description |
|---|---|
| AC association requirements | A list of one or more AC association operations that an edge enabler layer function requires for proper operation. |
| AC association capabilities | A list of one or more supported AC association operations that an edge enabler layer function is capable of initiating and/or processing. |
| AC association capabilities enabled | An indication of whether AC association capabilities of an edge enabler layer function are enabled or not |

TABLE 2-continued

Types of AC association discovery information

| Type of AC association capability information | Description |
|---|---|
| AC association privileges | A list of edge enabler functions that are permitted to initiate and/or perform AC association operations, the type of AC association operations that they are allowed initiate and/to perform, and/or the times and/or locations that they are allowed to initiate and/or perform these AC association operations. |

TABLE 3

Types of collected AC association information

| Type of collected AC association information | Description |
|---|---|
| ACs having a user association | ACs may have a user-based association with one another such as two users wanting to interact with one another via the use of the ACs (e.g., an online gaming session) |
| ACs having a location association | ACs may have a location-based association with one another such as ACs located in the same proximity or traveling along the same route as one another. |
| ACs using same EAS | ACs may have an association based on their use of the same instance or type of EAS. |
| ACs having application specific association | ACs may have an association based on application-specific context (e.g. two ACs may need to coordinate with one another to perform an application specific action or operation). |
| AC association notifications | Notifications to perform AC association operations (e.g. establish an AC association, update, or join an existing AC association, leave, or terminate an AC association). |

TABLE 4

Types of AC association request operations

| Type of AC association request operation | Description |
|---|---|
| establish AC association(s) | create new association(s) between two or more ACs |
| update AC association(s) | update existing AC association(s). E.g., add or remove an AC from the association or switch to a different EAS. |
| terminate AC association(s) | terminate AC association(s). E.g., disband an AC association that is no longer needed. |
| retrieve AC association(s) | Retrieve information regarding one or more existing AC associations (E.g., fetch AC association context(s)). |
| discover AC association(s) | discover AC association(s). E.g., discover existing AC associations having ACs of a similar type or that are in proximity to a requesting AC. |
| subscribe to AC association(s) | subscribe to receive notifications regarding . AC association(s) E.g., notification regarding newly established AC associations of interest, or AC associations of interest that have been updated or terminated. |
| invite AC(s) to join an AC association | Invite one or more ACs to join an AC association |
| relocate AC association context | relocate AC association context information between edge enabler layer functions. For example, relocate AC association context from S-EES/S-EAS to T-EES/T-EAS. Alternatively, rather than a dedicated type of AC association request, this operation may be performed by a combination of other AC association requests (e.g., retrieve, establish, terminate, etc.) |

TABLE 5

AC association request information

| Information Elements | Description |
|---|---|
| AC association request operation | See description in Table 4 |
| AC association request identifier | A unique identifier of the AC association request |

TABLE 5-continued

AC association request information

| Information Elements | Description |
|---|---|
| AC association discovery criteria | A list of criteria used to query against AC associations for discovery purposes. The criteria may consist of names of an AC association information elements as those defined in Table 1 and corresponding values of interest. |
| AC association notification criteria | A list of criteria used to detect if/when notifications applicable to AC association(s) are to be generated for one or more of the following types of events. A transition to a different serving EAS is required to maintain an existing AC association A new AC association has been established An existing AC association has been updated An existing AC association has been terminated An AC association invitation has been received |
| AC association notification address | An address where AC association notifications may be sent to. For example, a URI, IP address and port, a callback function, etc. |
| AC association context information | See description in Table 1 |

TABLE 5

AC association request information

| Information Elements | Description |
|---|---|
| AC association request operation | See description in Table 4 |
| AC association request identifier | A unique identifier of the AC association request |
| AC association discovery criteria | A list of criteria used to query against AC associations for discovery purposes. The criteria may consist of names of an AC association information elements as those defined in Table 1 and corresponding values of interest. |
| AC association notification criteria | A list of criteria used to detect if/when notifications applicable to AC association(s) are to be generated for one or more of the following types of events. A transition to a different serving EAS is required to maintain an existing AC association A new AC association has been established An existing AC association has been updated An existing AC association has been terminated An AC association invitation has been received |
| AC association notification address | An address where AC association notifications may be sent to. For example, a URI, IP address and port, a callback function, etc. |
| AC association context information | See description in Table 1 |

TABLE 6

| Types of E2E edge application service continuity (E2E-EASC) operations | |
| --- | --- |
| Type of E2E-EASC operation | Description |
| Determine serving EAS is no longer adequate | determine when a serving EAS is no longer able to provide service to one or more ACs defined within a given AC association; where determining may include: detecting one or more UEs hosting ACs defined within a given AC association have left or are about to leave the service area of a serving EAS, detecting the serving EAS is no longer able to provide the required level of service (i.e. KPIs) for one or more ACs defined within a given AC association, or receiving a request from another entity in the system (e.g. AC, EEC, EES, EAS, ECS) to transition an AC association from the serving EAS to a targeted EAS |
| discover and select an available targeted EAS | discover and select an available targeted EAS that has a service profile that meets the AC association requirements (e.g. EAS service area, KPIs, schedule) |
| instantiate targeted EAS | if a targeted EAS is not available, trigger the instantiation of a targeted EAS that provides the type of application and/or services required by the AC association |
| schedule and perform ACR operations | schedule and perform ACR operations to transition each of the ACs within the AC association to the targeted EAS such that the ACR operations are synchronized (i.e., start and end at the same time) and all the ACs are transitioned to the new targeted EAS in unison and that service interruption between the ACs is minimized, where scheduling and performing ACR operations can include sending ACR notifications to the EECs resident on the UEs hosting each of the ACs defined within a given AC association, where scheduling and performing ACR operations can include sending ACR notifications to the serving EAS and/or selected targeted EAS, where scheduling and performing ACR operations can include transferring AC association context. |
| handle ACR errors | detect the occurrence of ACR failures for one or more ACs defined within a given AC association and perform actions such as notifying the other ACs in the association of the ACR failures or selecting and triggering a new round of ACRs to transition all the ACs to an alternative targeted EAS |
| update AC association information | update end-to-end AC association information stored such that it reflects the ACR operation(s) that have been performed (e.g., new targeted EAS) such that the updated information may be later factored in to edge application service continuity operations |
| Send AC association notifications | Send AC association notification(s) to applicable entities (E.g., ACs, EECs, EASs, EESs, ECSs) to notify them of the E2E-EASC operation(s) performed to transition the AC association to the targeted EAS |

TABLE 7

| AC association response information | |
| --- | --- |
| Information Elements | Description |
| AC association response status | A status indicating whether the operation defined in the received AC association request was successfully processed or not. |
| AC association request identifier | An identifier that matches the AC association request identifier specified in the received request |
| AC association identifier(s) | Identifier(s) of AC association(s) that the received request was performed upon |
| AC association representation(s) | Representation(s) of the AC association(s) upon which the received request was performed upon. The representation(s) containing information elements such as those defined in Table 1. |
| AC association discovery results | A list of discovered AC associations or references to AC associations that match the specified AC association discovery criteria. |
| AC association subscription results | An identifier and/or representation of an AC association subscription. |

TABLE 7-continued

| AC association response information | |
| --- | --- |
| Information Elements | Description |
| AC invitation results | Indication(s) of whether invited AC(s) has accepted or rejected invitation to join AC association. |

TABLE 8

| AC association notification request information | |
| --- | --- |
| Information Elements | Description |
| AC association notification identifier | A unique identifier of the AC association notification request |
| AC association subscription identifier | A unique identifier of the AC association subscription relevant to this notification request |
| AC association notification event | A list of one or more detected AC association events such as but not limited to the following: |

TABLE 8-continued

AC association notification request information

| Information Elements | Description |
|---|---|
| | Request to establish an AC association |
| | An AC association has been established |
| | Request to update an AC association |
| | An AC association has been updated |
| | Request to terminate an AC association |
| | An AC association has been terminated |
| | Request to transition to a different serving EAS to maintain an AC association |
| | A transition to a different serving EAS has occurred to maintain an existing AC association |
| | An AC association invitation has been received |
| New EAS | An identifier of a new targeted EAS to transition to maintain AC association |
| New EES | An identifier of a new targeted EES to transition to maintain AC association |
| AC association context information | See description in Table 1 |

TABLE 10-continued

AC association notification response information

| Information Elements | Description |
|---|---|
| | not the AC association invitation is accepted, whether a transition to a different EAS was performed or not, etc. |
| AC association context | An updated AC association context or individual elements thereof (e.g., an updated list of ACs still actively taking part in the association, the targeted EAS and/or EES that was transitioned to and that is currently serving the associated ACs, etc.) |

TABLE 9

Notification events and corresponding operations

| Notification event | Operations performed |
|---|---|
| Request to establish an AC association | Determines whether or not to establish the requested AC association. If yes, then issue an AC association establishment request. Otherwise, ignore the request. |
| An AC association has been established | Extract the AC association context information from the notification and make use of it for AC association specific purposes (e.g., to determine which ACs to interact with). |
| Request to update an AC association | Determine whether or not to update the requested AC association. If yes, then issue an AC association update request. Otherwise, ignore the request. |
| An AC association has been updated | Extract the AC association context information from the notification and use it for AC association specific purposes (e.g., to switch the ACs to interact with). |
| Request to terminate an AC association | Determine whether or not terminate the requested AC association. If yes, then issue an AC association termination request. Otherwise, ignore the request. |
| An AC association has been terminated | Extract the AC association context information from the notification and use it for AC association specific purposes (e.g., to stop interacting with ACs that no longer a part of the association) |
| Request to transition to a different serving EAS to maintain an AC association | Determines whether or not to transition to the specified EAS to maintain the AC association. If yes, then transition to the new EAS. Otherwise, ignore the request. |
| A transition to a different serving EAS has occurred to maintain an existing AC association | Extract the AC association context information from the notification and use it for AC association specific purposes (e.g., transition to using the different EAS) |
| An AC association invitation has been received | Determines whether or not to accept the AC association invite. If yes, then accept the invite via an indication in the notification response. Otherwise, reject the invite by ignoring the invitation or sending a rejection back in the notification response. |

TABLE 10

AC association notification response information

| Information Elements | Description |
|---|---|
| AC association notification status | A status indicating whether the notification request was successfully received and processed or not. |
| AC association notification identifier | An identifier that matches the AC association notification identifier specified in the received request |
| AC association notification results | A list of results of the operations performed as a result of the AC association notification request. For example, whether or |

TABLE 11

Abbreviations

| 5GC | 5G Core Network |
|---|---|
| API | Application Programming Interface |
| AS | Application Server |
| AC | Application Client |
| ACR | Application Context Relocationing |
| CAS | Cloud Application Server |
| CN | Core Network |
| E2E | End-to-End |
| EAS | Edge Application Server |
| EASC | Edge Application Service Continuity |
| ECS | Edge Configuration Server |

55

TABLE 11-continued

| Abbreviations | |
| --- | --- |
| EES | Edge Enabler Server |
| EEC | Edge Enabler Client |
| GUI | Graphical User Interface |
| NEF | Network Exposure Function |
| NF | Network Function |
| SCS | Service Capability Server |
| SCEF | Service Capability Exposure Function |
| SEAL | Service Enabler Architecture Layer |
| SL | Service Layer |
| UE | User Equipment |
| URI | Universal Resource Identifier |

TABLE 12

| Terms | |
| --- | --- |
| application client | Application software resident in a device (e.g. UE) performing a client function |
| application server | Application software resident in the cloud performing a server function |
| application context | Metadata associated with an application client that is resident in an EES, EAS, EEC and/or ECS |
| application context relocationing | Migrating of application context between serving and targeted EESs and/or EASs as part of a service continuity procedure |
| device | User equipment (UE) or unmanned endpoint node in the system. |
| edge computing | A network architecture concept that enables cloud computing capabilities and service environments to be deployed close to endpoint devices (e.g., to meet low latency and tight synchronization requirements of application clients) |
| edge application server | An application server resident on an edge node in the network |
| application client service association | A relationship between ACs hosted on different UEs that interact with one another via application services provided by a serving AS or EAS. |
| edge application service continuity | Minimization of service interruptions to an AC when migrating the AC from a serving EAS to a targeted EAS. |
| E2E edge application service continuity | Minimization of service interruptions to ACs, having an association and interacting with one another, when migrating the ACs from a serving EAS to a targeted EAS. |
| edge enabler layer | Refers to the overall functionality provided by the entities such as an EEC, EES and ECS |
| edge enabler layer function | An AC, EEC, ECS, EES or EAS. |

We claim:

1. A method performed by a service resident on a first wireless transmit/receive unit (WTRU), the method comprising:

receiving, from a first application resident on the first WTRU, information for an association between the first application and a second application resident on a second WTRU, wherein the association information comprises identifiers of the first application and the second application and a type of application service required by the first application and the second application to interact with each other;

sending the association information to a service in a network such that the first and the second applications are assigned by the service in the network to a first application server providing the type of service required by the first application and the second application to interact with each other;

detecting the first WTRU's location is no longer in a service area of the first application server; and

sending a request to the service in the network such that the first application and the second application are assigned by the service in the network to a second application server providing the type of service required by the first application and the second application to interact with each other.

2. The method of claim 1, wherein the association information further comprises association service key performance indicators (KPIs) that further comprise one or more of: an aggregated connection bandwidth to the application service required by the first and second applications, or an aggregated rate of requests to the application service required by the first and second applications.

3. The method of claim 1, wherein the association information further comprises a service area for which the association between the first application and the second application is applicable.

4. The method of claim 1, wherein the association information further comprises a schedule for which the association between the first application and the second application is valid or active.

5. The method of claim 1, wherein the association information further comprises an association control element to control whether the association between the first application and the second application is enabled or disabled.

6. The method of claim 1, wherein the association information further comprises identifiers of the first WTRU and second WTRU.

7. The method of claim 1, wherein the first application server and the second application server each comprise an edge application server.

8. A method performed by a service resident in a network, the method comprising:

receiving, from a service resident on a first WTRU, information for an association between a first application of the first WTRU and a second application resident on a second WTRU, wherein the association information comprises identifiers of the first application and the second application and a type of application service required by the first application and the second application to interact with each other;

assigning, based on the association information, the first application and the second application to a first application server providing the type of service required by the first application and the second application to interact with each other;

detecting the first WTRU's location is no longer in a service area of the first application server; and assigning, based on the association information, the first application and the second application to a second application server providing the type of service required by the first application and the second application to interact with each other.

9. The method of claim 8, wherein the association information further comprises association service key performance indicators (KPIs) comprising one or more of an aggregated connection bandwidth to the service required by the first application and the second application, or an aggregated rate of requests to the service required by the first application and the second application.

10. The method of claim 9, wherein the association information further comprises a service area for which the association between the first application and the second application is applicable.

11. The method of claim 10, wherein the association information further comprises a schedule for which the association between the first application and the second application is valid or active.

12. The method of claim 11, wherein the association information further comprises an association control element to control whether the association between the first application and the second application is enabled or disabled.

13. The method of claim 12, wherein the association information further comprises identifiers of the first WTRU and second WTRU.

14. The method of claim 8, wherein the first application server and the second application server each comprise an edge application server.

15. An apparatus, the apparatus being a first wireless transmit/receive unit (WTRU) comprising a processor, and memory storing instructions, that when executed by the processor cause the apparatus to:

receive, from a first application resident on the first WTRU, information for an association between the first application and a second application resident on a second WTRU, wherein the association information comprises identifiers of the first and second applications and a type of application service required by the first application and the second application to interact with each other;

send the association information to a service in a network such that the first application and the second application are assigned by a service in the network to a first application server providing the type of service required by the first application and the second application to interact with each other;

detect the first WTRU's location is no longer in a service area of the first application server; and send a request to the service in the network such that the first application and the second application are assigned by the service in the network to a second application server providing the type of service required by the first application and the second application to interact with each other.

16. The apparatus of claim 15, wherein the association information further comprises association service key performance indicators (KPIs) that further comprise one or more of: an aggregated connection bandwidth to the application service required by the first and second applications, or an aggregated rate of requests to the application service required by the first and second applications.

17. The apparatus of claim 15, wherein the association information further comprises a service area for which the association between the first application and the second application is applicable.

18. The apparatus of claim 15, wherein the association information further comprises a schedule for which the association between the first application and the second application is valid or active.

19. The apparatus of claim 15, wherein the association information further comprises an association control element to control whether the association between the first application and the second application is enabled or disabled.

20. The apparatus of claim 15, wherein the association information further comprises identifiers of the first WTRU and second WTRU.

\* \* \* \* \*